United States Patent
Gummin et al.

(10) Patent No.: US 7,256,518 B2
(45) Date of Patent: Aug. 14, 2007

(54) SHAPE MEMORY ALLOY ACTUATORS

(76) Inventors: Mark A. Gummin, 1731 Saint Andrews Ct., St. Helena, CA (US) 94574; William Donakowski, 181 Creekside Ct., El Sebranto, CA (US) 94803; Geoffrey Gaines, 2927 Regent St., Berkeley, CA (US) 94705

( * ) Notice: Subject to any disclaimer, the term of this patent is extended or adjusted under 35 U.S.C. 154(b) by 360 days.

(21) Appl. No.: 10/889,814

(22) Filed: Jul. 13, 2004

(65) Prior Publication Data
US 2004/0256920 A1 Dec. 23, 2004

Related U.S. Application Data

(63) Continuation-in-part of application No. 10/056,233, filed on Dec. 3, 2001, now Pat. No. 6,762,515, which is a continuation of application No. 09/566,446, filed on May 8, 2000, now Pat. No. 6,326,707.

(51) Int. Cl.
*F02G 1/04* (2006.01)
*F01B 29/10* (2006.01)

(52) U.S. Cl. .......................... 310/12; 60/527; 310/306

(58) Field of Classification Search .......... 60/527, 60/528
See application file for complete search history.

(56) References Cited

U.S. PATENT DOCUMENTS

| | | | |
|---|---|---|---|
| 1,658,669 A * | 2/1928 | Cohn et al. | 310/306 |
| 5,727,391 A * | 3/1998 | Hayward et al. | 60/528 |
| 6,574,958 B1 * | 6/2003 | MacGregor | 60/527 |
| 7,017,345 B2 * | 3/2006 | Von Behrens et al. | 60/527 |
| 2002/0113499 A1 * | 8/2002 | von Behrens et al. | 310/12 |

* cited by examiner

*Primary Examiner*—Burton Mullins
(74) *Attorney, Agent, or Firm*—Howard Cohen

(57) ABSTRACT

Linear actuators comprised of a plurality of geometric links connected together in displacement multiplied fashion by a plurality of SMA wires. The links may have a trigon or chevron configuration. The trigon links may be combined with a hexagonal or rhomboidal shaft to create a defined stacking pattern of links about the shaft. The shaft extends from the medial portion of the stack. Ohmic heating circuits connect to non-moving ends of SMA wires. Various groupings of links in parallel displacement are described.

54 Claims, 16 Drawing Sheets

SHAPE MEMORY ALLOY ACTUATORS

CROSS-REFERENCE TO RELATED APPLICATIONS

This application is a continuation-in-part of application Ser. No. 10/056,233, filed Dec. 3, 2001, and issued as U.S. Pat. No. 6,762,515 on Jul. 13, 2004, which is a continuation of application Ser. No. 09/566,446, filed May 8, 2000 and issued as U.S. Pat. No. 6,326,707 on Dec. 4, 2001, for which priority is claimed.

FEDERALLY SPONSORED RESEARCH

Not applicable.

SEQUENCE LISTING, ETC ON CD

Not applicable.

BACKGROUND OF THE INVENTION

1. Field of the Invention

This invention relates to linear and rotary actuators and, in particular, to non-electromagnetic linear and rotary actuators.

2. Description of Related Art

Linear actuators find widespread applications in industrial, commercial, vehicular, and domestic settings, in uses ranging widely from electric door locks and windshield wipers in automobiles to pin pullers and shutter controllers in mechanical designs. Generally speaking, linear actuators comprise solenoid devices in which an electromagnet is used to translate an armature, and the retraction or extension of the armature is operatively connected in a mechanism to perform useful work. Such devices are commodity items that are manufactured in many sizes, force/stroke outputs, and AC or DC operation.

Despite their widespread adoption, electromagnetic linear actuators have several important drawbacks that require design accommodations in mechanical systems. Due to the use of electromagnetism as the motive force, these devices necessarily require ferromagnetic materials to define the armature as well as a magnetic flux circuit to maximize the stroke force. Such materials are typically dense, and their use results in devices that are rather large and heavy, particularly in comparison to their stroke/force output characteristics. Moreover, the multiple turns of wire that comprise an electromagnet, typically hundreds or thousands, add another substantial mass to the device.

Another drawback of electromagnetic linear actuators is also due to the use of electromagnetism as the driving force. Typically, as the armature is extended from the electromagnetic, increasing portions of the armature are removed from the influence of the electromagnetic field, and the driving force is concomitantly reduced. As a result, the force versus stroke displacement characteristics of these devices generally exhibit high initial force values that decline rapidly with increase in stroke displacement. In many mechanisms it is desirable to deliver a constant force linear stroke, and it is necessary to design additional mechanisms to make use of the negatively sloped force/displacement characteristic.

In recent years much interest has been directed toward shape memory alloy (hereinafter, SMA) materials and their potential use in linear actuators. The most promising material is nickel titanium alloy, known as Nitinol, which, in the form of a wire or bar, delivers a strong contraction force upon heating above a well-defined transition temperature, and which relaxes when cooled. Assuming the Nitinol wire is heated ohmically or by extrinsic means, there is no need for the ferromagnetic materials and numerous windings of the prior art electromagnetic linear actuators, and there is the promise of a lightweight linear actuator that delivers a strong actuation force. Moreover, the force versus displacement characteristic of SMA is much closer to the ideal constant than comparable electromagnetic devices.

Despite the great interest in SMA actuators and many forms of SMA actuators known in the prior art, no practical SMA actuator mechanism has proven to be reliable over a large number of operating cycles. It has been found that Nitinol wire requires a restoring force to assist the material in resuming its quiescent length when its temperature falls below the material's transition temperature. Many prior art SMA actuator designs have made use of common spring assemblies, such as helical or leaf springs, to exert the required restoring force. These spring assemblies typically deliver a spring force that varies linearly with displacement, ($F=kx$), and the restoring force in most cases is a maximum at maximum stroke. It has been found that the SMA component responds poorly to this force/displacement characteristic, and the useful life of the SMA actuator is severely limited by such a restoring force. To overcome this problem, prior art designers have attempted to use simple weights depending from pulleys to exert a constant restoring force on the SMA component. Although more effective, this expedient results in a mechanism that is not easily realized in a small, widely adaptive package.

Another drawback inherent in known SMA materials is the relatively small amount of contraction that is exerted upon heating past the transition temperature. The maximum contraction is about 8%, and the useful contraction for repeated use is about 6%. Thus, to achieve a direct displacement stroke from the SMA component of about one inch, the SMA component must be over sixteen inches long. This material limitation results in a minimum size that is too large for many applications. Some prior art designs overcome this problem by wrapping the SMA wire about one or more pulleys to contain the necessary length within a shorter space. However, the SMA wire tends to acquire some of the curvature of the pulleys as it is repeatedly heated and cooled, and loses too much of its ability to contract longitudinally. The result is failure after a few number of operating cycles. Other prior art designs employ lever arrangements or the like to amplify the SMA displacement, with a concomitant reduction in output force.

It is evident that the prior art has failed to fully exploit the full potential of shape memory alloy, due to the lack of a mechanism that capitalizes on the useful material characteristics of SMA.

BRIEF SUMMARY OF THE INVENTION

The present invention generally comprises a linear actuator that employs a shape memory alloy component to deliver a relatively long stroke displacement and reiterative operation over a large number of cycles.

In one aspect, the invention provides a plurality of SMA sub-modules, each capable of displacement upon heating of the respective SMA component. The sub-modules are linked in a serial mechanical connection that combines the stroke displacement of the sub-modules in additive fashion to achieve a relatively long output stroke. Moreover, the sub-modules may be assembled in a small volume, resulting in an actuator of minimal size and maximum stroke displacement.

The sub-modules may be fabricated as rods or bars adapted to be disposed in closely spaced adjacent relationship, each rod or bar linked in serial mechanical connection to the adjacent rod or bar. Alternatively, the sub-modules may comprise concentric motive elements, with the serial mechanical connection extending from each motive element to the radially inwardly adjacent motive element, whereby the innermost motive element receives the sum of the translational excursions of all the motive elements concentric to the innermost element. For all the sub-module embodiments, the serial links therebetween are provided by one or more shape memory alloy wires, each wire connected at opposed ends of adjacent sub-modules to apply contractile force therebetween.

In another aspect, the invention provides an SMA linear actuator assembly employing a spring assembly that is designed to apply a restoring force tailored to optimize the longevity of the SMA component. In one embodiment of the spring assembly, a roller/band spring (hereinafter, rolamite) is connected to the output shaft of the linear actuator assembly. The rolamite spring exerts a restoring force characterized by a decrease in force with increasing displacement, so that the SMA components are returned to their quiescent form with a minimum of residual strain. In a further embodiment, the spring assembly is comprised of a bar or rod connected to the output shaft of the SMA actuator assembly and confined in a channel for longitudinal translation therein. The bar includes shaped cam surfaces extending longitudinally therealong, and a cam follower extends from the channel and is resiliently biased to engage the cam surfaces. As the bar is translated by actuation of the SMA linear actuator assembly, the cam follower exerts a restoring force that is a function of the slope of the cam surface and the magnitude of the resilient force on the cam follower. By appropriate shaping of the cam surface, the assembly exerts on the SMA linear actuator assembly a restoring force characterized by a decrease in force with increasing displacement, whereby the number of cycles of operation is maximized.

In a further aspect, the invention includes a housing in which a plurality of drive rods are arrayed in generally parallel, adjacent relationship and supported to translate freely in their longitudinal directions. One end of each drive rod is connected to the opposed end of an adjacent drive rod by an SMA wire, defining a series of drive assemblies connected in additive, serially linked chain fashion. At one end of the chain, the drive assembly is joined by an SMA wire to the housing, and at the other end of the chain, the housing is provided with an opening through which an actuating rod may extend. Also secured in the housing is a spring, such as a rolamite roller/band spring, having one end connected to the housing and the other end connected to the actuator rod. The spring is designed to exert a restoring force having a constant or negative force versus displacement relationship.

Each SMA wire is connected in an electrical circuit, in one of several arrangements of series or parallel connections, so that ohmic heating may be employed to heat the SMA wires beyond their phase transition temperature. In the chain-connected series of SMA drive assemblies, the resulting contraction of the SMA wires is cumulative and additive, and the actuating rod is driven to extend from the housing with a high force output. When the current in the circuit is terminated, the SMA wires cool below the transition temperature, and the spring restores the SMA wires to their quiescent length by urging the actuating rod to translate retrograde and (through the chained connection of assemblies) to apply sufficient tension to re-extend all the SMA wires.

It may be appreciated that the SMA wires remain in substantially linear dispositions throughout the contraction/extension cycle, so that flex-induced stresses are avoided. To assist in heat removal for high power applications, the housing may be filled with oil or other thermal absorber, which may be cooled passively or actively. To deliver additional force, two or more SMA wires may be connected between the drive assemblies, rather than one wire. To provide enhanced actuation and retraction times, the SMA wires may be thinner. Although the invention is described with reference to the shape memory component comprising a wire formed of Nitinol, it is intended to encompass any shape memory material in any form that is consonant with the structure and concept of the invention.

In addition, each rod or bar is comprised of a link having a cross-sectional configuration particularly adapted for SMA wire-driven, displacement multiplied applications. In one embodiment, all links have a trigon configuration comprised of an equilateral triangular cross section defining identical longitudinally extending planar faces. A wire groove extends longitudinally to bisect each planar face. The triangular vertices are radiused to blunt any sharp edge or wear point. Each planar face is provided with an inset crimp pocket that is dimensioned to receive and retain a crimp applied to one end of an SMA wire.

The trigon configuration provides stiffness and bend-resistance greater than a rectangular beam of similar mass and length. Moreover, it facilitates a range of stacking patterns that enables a wide range of output stroke or force from a rather small actuator assembly. The links may be arrayed in abutting (planar face to planar face) contact and surrounding a central output shaft, which may have an hexagonal or rhomboidal cross-sectional configuration. The links may be connected serially by SMA wires to produce a maximum stroke, or may be grouped in parallel action relationship to provide a shorter, more powerful stroke. The number of links may vary from 8, 10, 12, 14, and 18 link stacking patterns about the central output shaft. Each stacking pattern embodiment is provided with a housing that has a longitudinal inner opening that conforms to the outer configuration of the stacked links, whether rectangular, rhomboidal, hexagonal, or the like. The outer surface of the housing may generally conform to the inner opening, or may be provided with a rectangular, ovoid, cylindrical, or similar configuration.

In a further embodiment all links have a chevron configuration comprised of generally rectangular cross-section having substantially greater width than height, with short flanges extending longitudinally along opposite upper vertices and beveled vertices extending longitudinally along opposite lower vertices. A SMA wire groove extends longitudinally along the midline of the upper surface, and a similar SMA wire groove extends longitudinally along the midline of the lower surface. A crimp pocket may be formed in one end of the upper surface and the opposite end of the lower surface.

In vertically stacked, abutting relationship, the beveled vertices of each link nest in the flanges of the subjacent link to limit sliding movement only to the longitudinal direction. Each SMA wire is crimped between the upper surface of one link and the lower surface of the superjacent link. The wire grooves of the confronting upper and lower surfaces define a channel through which the SMA wire extends, the lateral confines of the channel defining an intrinsic return mechanism (IRM) that causes the SMA wire to return to substantially 100% length upon cooling below the shape transition temperature.

The SMA wires may be linked in serial stacking order to produce a maximum stroke output at the upper or lower link of the vertical stack. Alternatively, the medial link in the stack may be connected serially to the series of links above and below it, so that the superjacent links operate in parallel to the subjacent links to translate the medial link in a stroke that is half the maximum possible stroke but twice the force. The device is housed in a rectangular housing that has a small end section in comparison to the length of the housing.

In either the trigon or chevron embodiments, the housing may comprise a generally tubular member having an inner surface configured to engage in complementary fashion the outer surfaces of the links that are arrayed therewithin. A pair of end caps are secured in the opposed ends of the tubular member, and one or both end caps is provided with an opening through which the output shaft may extend. At least one end cap may include a keyway to accept a key on the output shaft that resists rotation of the shaft by the device to which it is coupled.

DETAILED DESCRIPTION OF THE INVENTION

The present invention generally comprises a linear actuator that employs at least one shape memory alloy component as the driving element. The invention provides relatively long stroke displacement with high force, and delivers reiterative operation over a large number of cycles.

Figure 1:
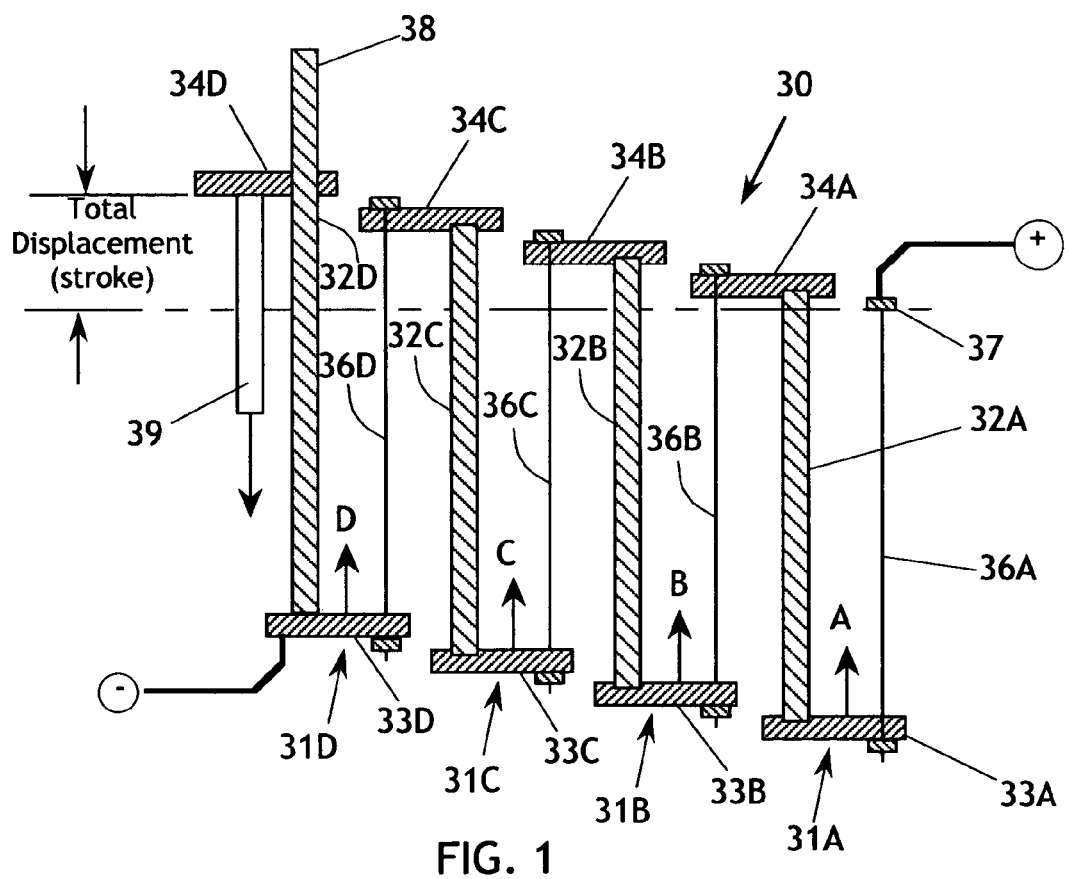
FIG. 1 is a schematic mechanical diagram depicting the fundamental components of the shape memory alloy actuator of the present invention.

With regard to FIG. 1, one significant aspect of the invention is the provision of a plurality of stages or sub-modules 31A-31D that form the linear actuator motor 30. Each sub-module 31 includes a longitudinally extending rod 32, and end brackets 33 and 34 secured to the lower end and upper end of the rod 32, respectively. The sub-modules 31 are arranged to translate reciprocally in the longitudinal direction. Note that the brackets 33 and 34 are generally parallel and extend in opposed lateral directions. A SMA wire 36A extends from the lower bracket 33A to an anchor point 37, SMA wires 36B extends from the lower bracket 33B of sub-module 31B to the upper bracket 34A of sub-module 31A, and SMA wires 36C and 36D join sub-modules B to C, and C to D, to complete a serial chain connection. The SMA wires 36A-36D are fabricated to undergo a phase transition upon heating to a predetermined temperature to contract approximately 4%-8%. The contractile force and excursion of each SMA wire, represented by arrows A-D, is applied between the sub-modules 31A-31D, each pulling on the next adjacent one, whereby the contractile excursion of each SMA wire 36A-36D is combined additively. Thus the sub-module 31D undergoes the greatest translation when all SMA wires contract, as labeled in FIG. 1 as total displacement (stroke). Indeed, the effective length of SMA wire in the mechanism is substantially equal to the sum of the lengths of all the SMA wires 36A-36D. This effective length is achieved in a compact mechanism, without resort to pulleys or other bending of the SMA wires.

The longitudinal rod 32D may be provided with an extended distal end 38 to facilitate delivering the output of the actuator 30 to operate a mechanism or perform other useful work. The SMA wires may be heated by connecting them in an electrical circuit that directs a current through all the SMA wires for ohmic heating. The circuit may extend from a negative terminal to bracket 33D, and thence through SMA wire 36D to the adjacent sub-module 31C, and so on to a positive connection at anchor point 37. In this series connection all wires 36 are heated at the same time and, due to the same current passing through all wires 36, to the same extent.

The linear actuator described thus far with respect to FIG. 1 will exhibit a limited useful life (one or a few cycles of contraction and extension), due to the fact that SMA wire will not relax fully when cooled below the phase transition temperature, unless a restoring force is applied in the extension direction. To provide a restoring force, a spring 39 is connected at one end to the bracket 34D of sub-module 31D, and the other end is secured to a fixed structural point. The spring 39 is arranged to be extended by outward movement of the bracket 34D, thus undergoing extension that increases as the wires 36 contract. When the wires are cooled and contract, the spring restoring force applied to the bracket 34D is applied equally through the linked sub-modules 31 to all the SMA wires 36. This restoring force aids the SMA wires in returning substantially fully to their original length, thus greatly lengthening the useful life of the mechanism 30. Preferred embodiments of the spring 39 are described in the following specification, although standard forms of coil, leaf, or elastomer springs will suffice for a limited useful life of the mechanism 30.

Figure 2:
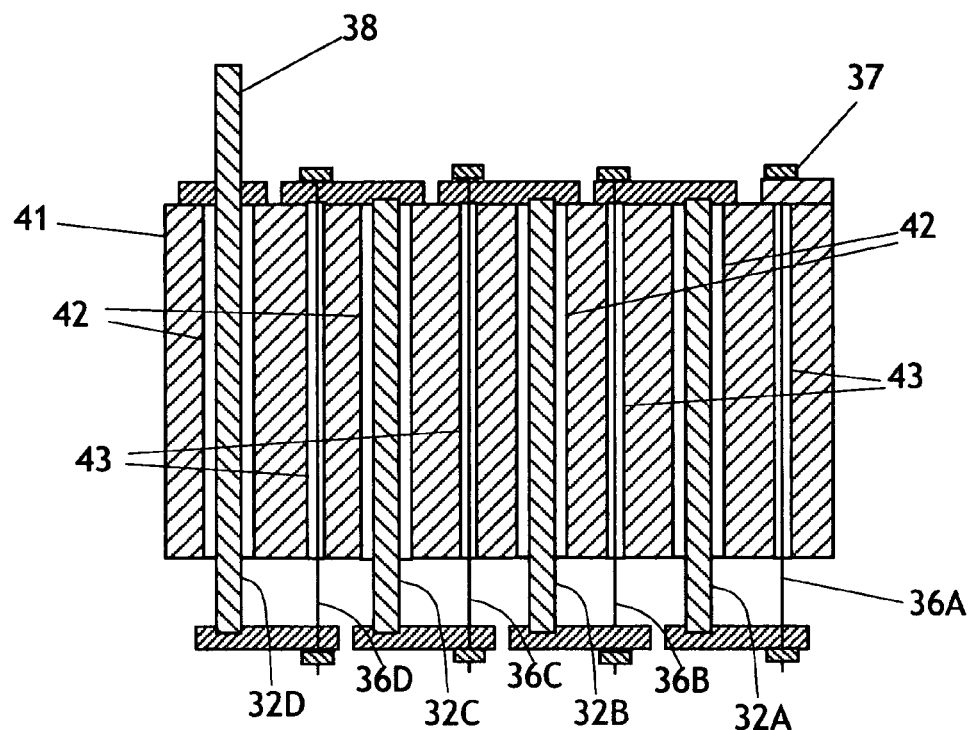
FIG. 2 is a cross-sectional elevation of one embodiment of the shape memory alloy actuator of the present invention.

With regard to FIG. 2, the invention may provide a block-like housing 41 for securing the sub-modules 31 in a compact assembly. The housing includes a plurality of passages 42 extending therethrough in generally parallel arrangement to permit the longitudinal rods 32A-32D to extend therethrough. Likewise, a plurality of passages 43 extend parallel and interspersed with the passages 42, to receive the SMA wires 36A-36D therethrough. The passages 42 are dimensioned to permit freely translating motion without any significant lateral movement, and the passages 43 are dimensioned to receive the SMA wires with clearance to eliminate contact. The array of passages 42 and 43 is laid out to accept the sub-modules 31A-31D in serial linked fashion, as described above, and this layout may be in a linear arrangement or in a curved plane that contains all the axes of the passages 42, further foreshortening the outer dimensions of the housing 41.

Figure 5:
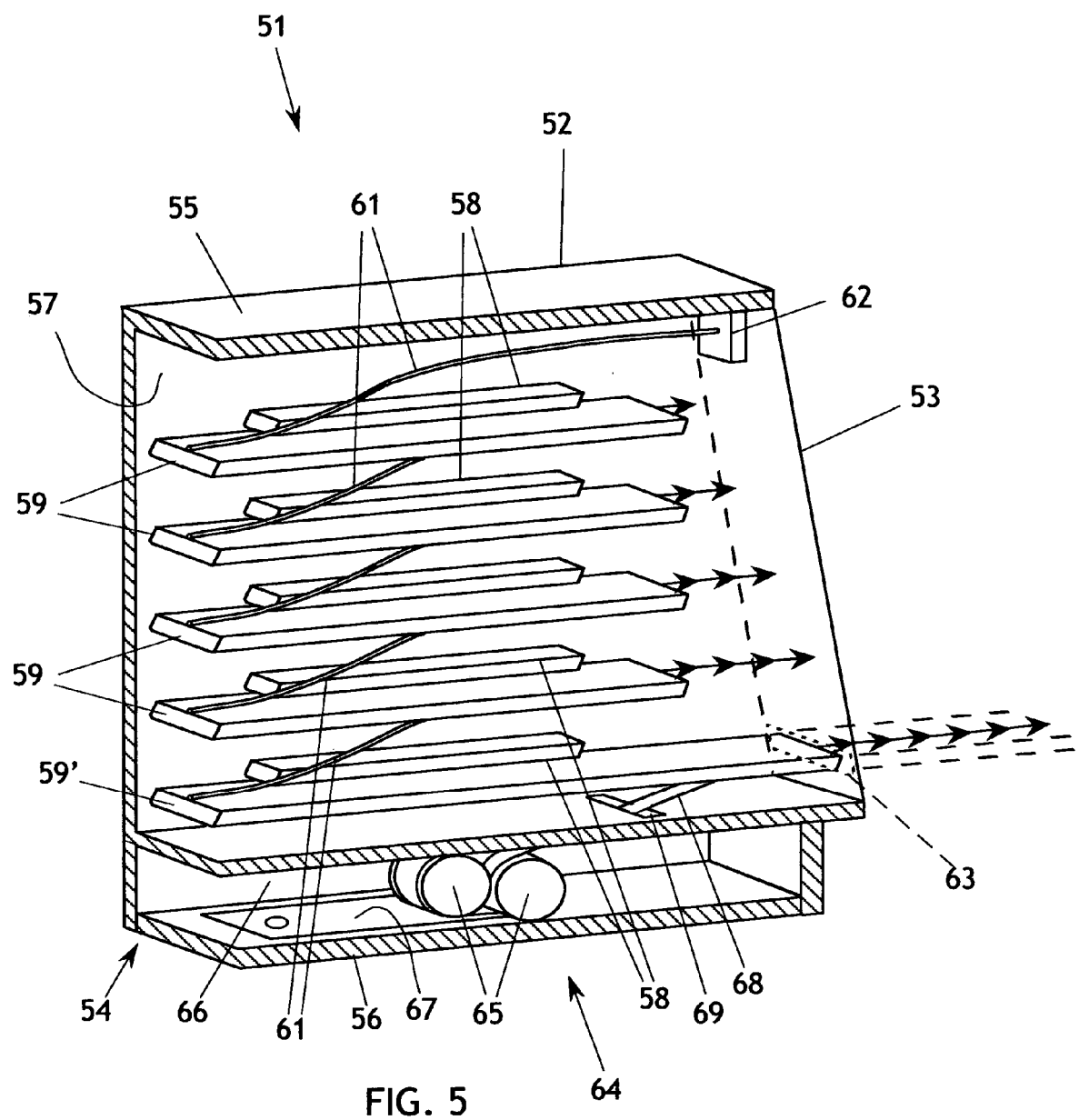
FIG. 5 is a partially cutaway side elevation showing a further embodiment of the shape memory alloy actuator of the present invention.

With regard to FIG. 5, a further embodiment of the invention comprises a linear actuator 51 having an outer shell-like housing 52 defined by front, rear, top, and bottom walls 53-56, respectively, in a trapezoidal configuration, and side walls 57 (only one shown in the cutaway view) extending therebetween to form a closed interior space. A plurality of track elements 58 are supported on both side walls 57 in parallel arrays that define slots extending longitudinally in a parallel, vertically spaced arrangement. A plurality of drive bars 59 are provided, each supported in one of the slots defined by the track elements 58 and received therein in freely translating fashion in their longitudinal direction. The drive bars 59 are disposed in a vertically stacked array, and may extend distally or retract proximally along the slots in which they are supported.

A plurality of SMA wires 61 is provided, each extending between and connected to the proximal end of one drive bar 59 and the distal end of the vertically superjacent drive bar. At the top of the vertically stacked array of drive bars, the SMA wire 61 is connected at its distal end to an anchor point 62. At the bottom of the vertically stacked array the drive bar 59' is provided with an elongated distal end that is aligned with a window 63 in end wall 53, through which it may extend. The SMA wires 61 may be heated to a temperature above the phase transition temperature to contract the wires 61. (Electrical wire connections are not shown for simplification of the drawing.) Each drive bar 59 is advanced incrementally, as shown by the arrow at the distal end of each bar 59, and, since each wire 61 is anchored in the superjacent moving bar, the incremental translation of each bar is applied to the subjacent bar. Consequently, the lowermost bar 59' undergoes the greatest longitudinal translation, extending through the opening 63 to perform useful work.

The SMA wires undergo a contraction of approximately 4%-8%. In the embodiment of FIG. 5, the configuration of the SMA wires determines that the contractile force is exerted substantially along the longitudinal directions of the drive bars 59, and that the angle of the force vector does not change appreciably between the contracted and extended states of the wires 61.

A spring assembly 64 is disposed below the lowermost drive bar 59', and is attached thereto to apply a restoring force to bar 59' and thus to all the SMA wires 61. The spring assembly 64 comprises a rolamite spring, known in the prior art and described fully in Sandia Laboratory Report no. SC-RR-67-656, and available from the Clearinghouse for Federal Scientific and Technical Information of the National Bureau of Standards. Briefly, the spring consists of a pair of rollers 65 retained within chamber 66, and a band spring 67 that is passed about both of the rollers 65 in an S configuration. The band spring 67 includes a tongue 68 extending therefrom through opening 69 and secured to the drive bar 59'. The rolamite spring tongue exerts a specified, engineered restoring force on the bar 59' to assure that all the SMA wires 61 return to their fully extended disposition when the wires 61 are cooled below their shape memory transition temperature.

Figures 3, 4:
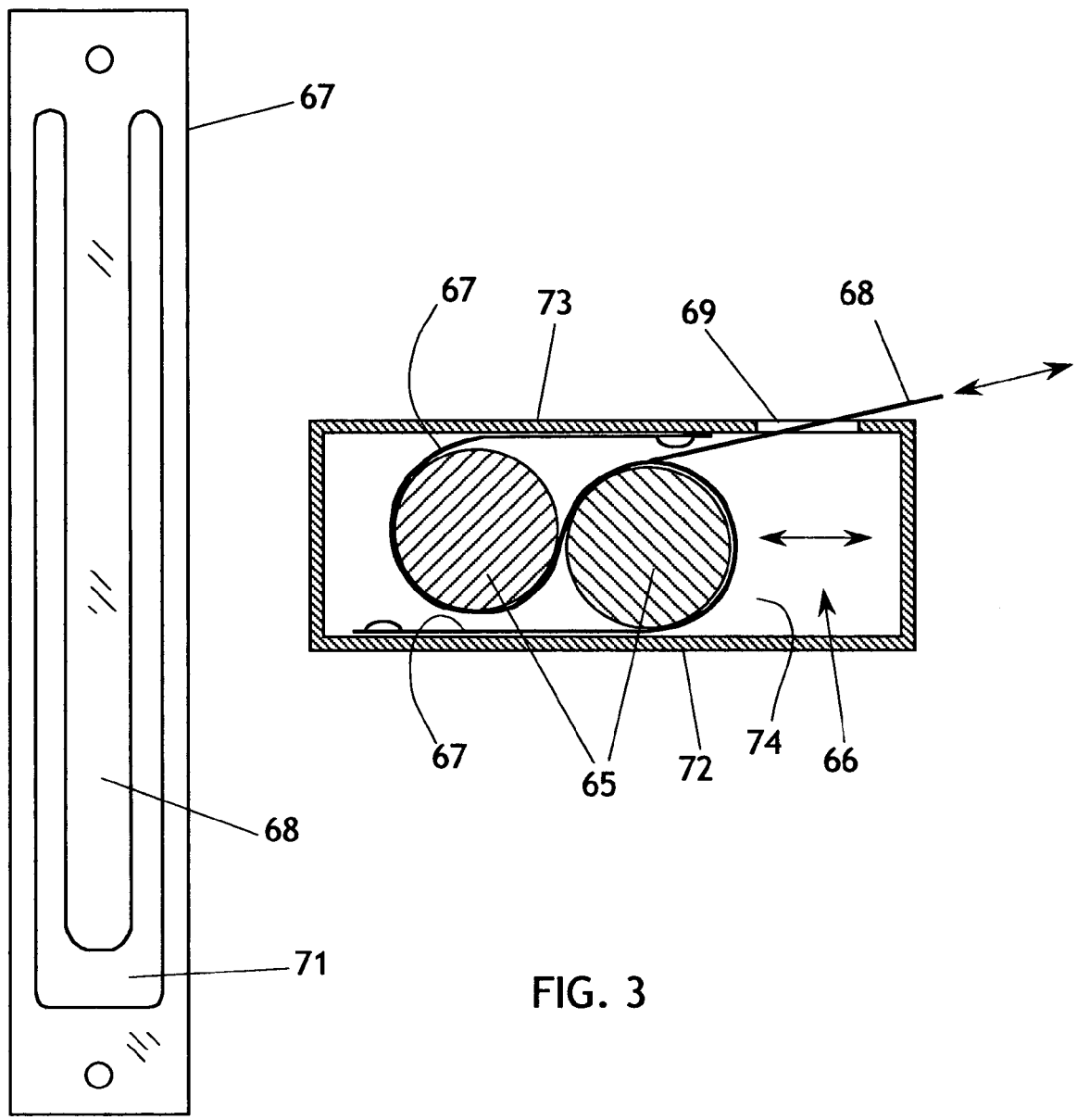
FIG. 3 is a cross-sectional end view of a negative force constant rolling band spring assembly of the shape memory alloy actuator of the present invention.
FIG. 4 is a plan view of one embodiment of the band spring of the rolling band spring assembly depicted in FIG. 3.

As shown in greater detail in FIGS. 3 and 4, the band spring 67 preferably is provided with an internal cutout 71 in an extended U configuration to define the longitudinally extending tongue 68. The chamber 66 is defined by upper and lower walls 72 and 73, respectively, to constrain vertical movement of the rollers. Side walls 74 (only one shown) join the upper and lower walls, and constrain lateral movement of the rollers 65, so that the rollers 65 may move only longitudinally in the chamber 66. The band spring 67 is secured at a proximal end to the inner surface of the lower wall 72, and is passed about the two rollers 65 in an S configuration, as evident in FIG. 3. The distal end of the band spring 67 is secured to the inner surface of the upper wall 73, and the tongue 68 diverges from the S configuration to extend through the window 69 to join the drive bar 59'. As the tongue 68 extends from the opening 69 it pulls the band spring 67 distally, causing the rollers to roll on their respective portions of the band spring as they translate distally. The spring return force exerted on the tongue 68 is directly related to the difference between the energy liberated as portions of the band unbend versus the energy required to bend other portions of the band when the two rollers translate longitudinally. By selectively varying the width of the band spring 67, or selectively varying the width of the cutout 71, it is readily possible to generate a spring return force that follows a predictable mathematical function.

Figure 7:
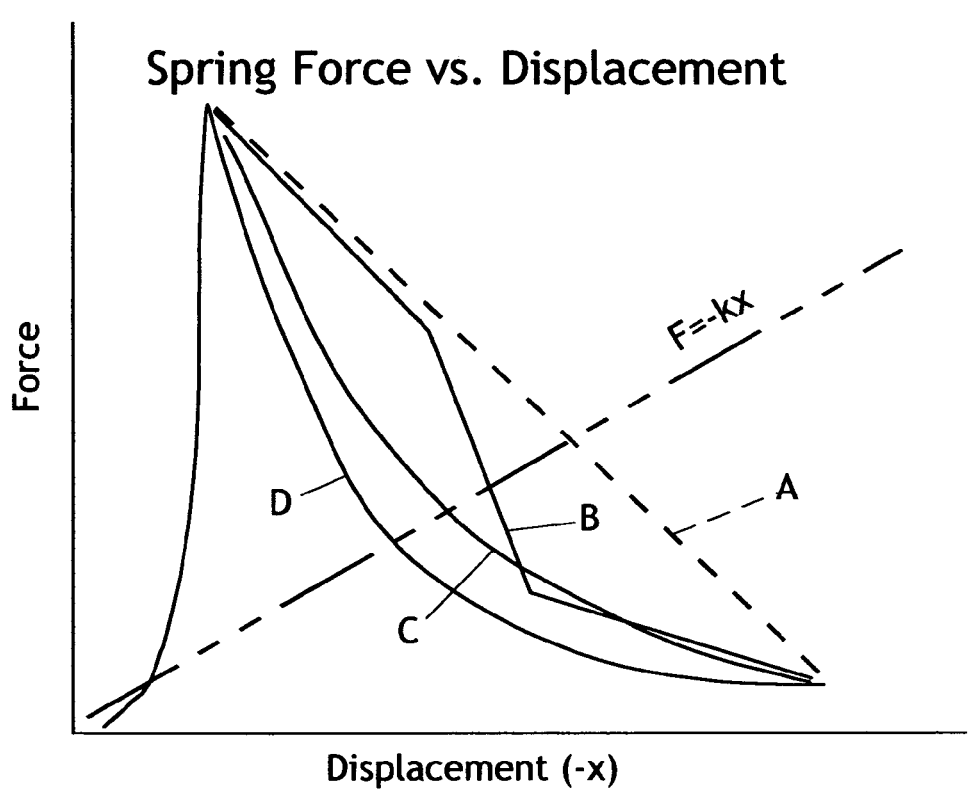
FIG. 7 is a graph depicting force versus displacement for different spring assemblies.
Figure 9:
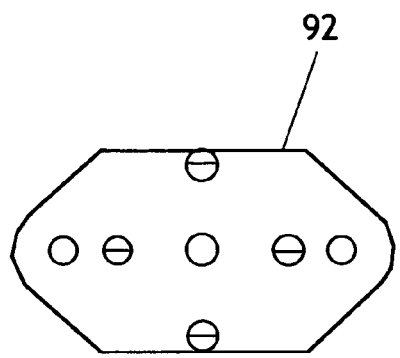
FIG. 9 is a top view of the embodiment of the actuator invention depicted in FIG. 8.
Figure 8:
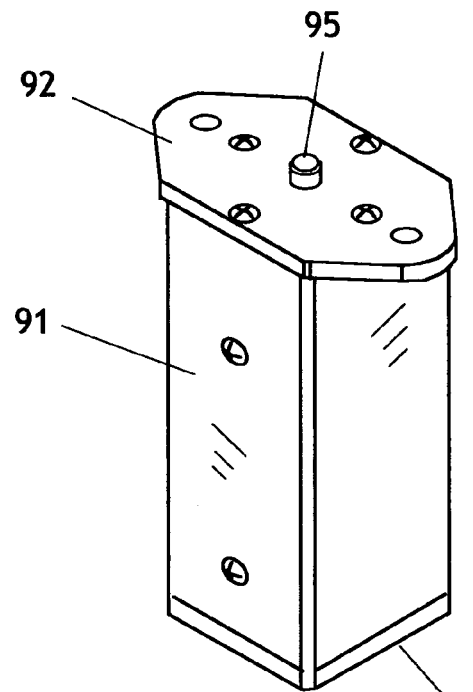
FIG. 8 is a perspective view of a further embodiment of the shape memory alloy actuator of the present invention.
Figure 10:
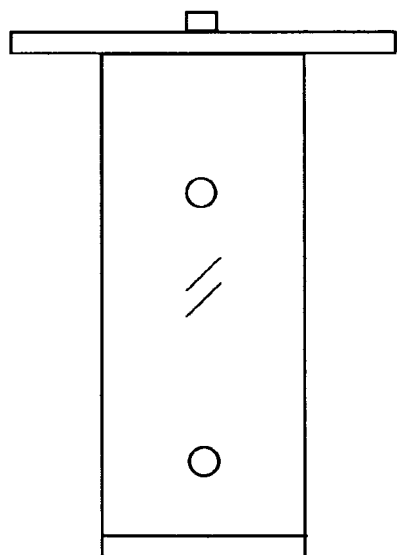
FIG. 10 is a side elevation of the actuator invention depicted in FIGS. 8 and 9.

As depicted graphically in FIG. 7, a typical prior art helical spring or leaf spring develops a restoring force F that varies generally linearly with displacement x, or, F=−kx. For a rolamite spring, the function that relates spring return force with displacement may differ significantly from a typical coil spring or leaf spring. In particular, for restoring the SMA linear actuator mechanisms described herein, it has been found that the optimal force for restoring the SMA wires to full extension is one having a negative force constant; i.e., the restoring force decreases as extension of the spring increases. This force characteristic preserves the shape memory effect to the maximum extent, and results in a useful working life (in terms of total number of cycles of operation) in the same range as typical prior art linear actuators.

In other words, the slope of the graph representing the spring function exhibits a negative slope in at least a portion of the spring excursion. If the negative slope is constant, the graph will be linear and parallel to line A of FIG. 7. The negative slope may change at different spring sections, producing a graph B comprised of several contiguous linear segments. Or the negative slope may vary continuously, producing a smoothly curved graph of the spring function, as represented by graphs C and D. (The band spring may also be fashioned to define positive slope areas, discontinuous spring functions, detent and dwell portions, neutral spring force, and the like, as required to provide these desired mechanical functions.)

It should be noted that the contractile force of the SMA wire phase transition is substantially constant as contraction takes place. As a result, the force delivered by the linear actuators described herein is substantially constant throughout the outward excursion of the actuator. This desirable characteristic is in marked contrast to typical solenoid actuators, which produce maximum force at initial actuation and taper off significantly as translation progresses.

Figure 6:
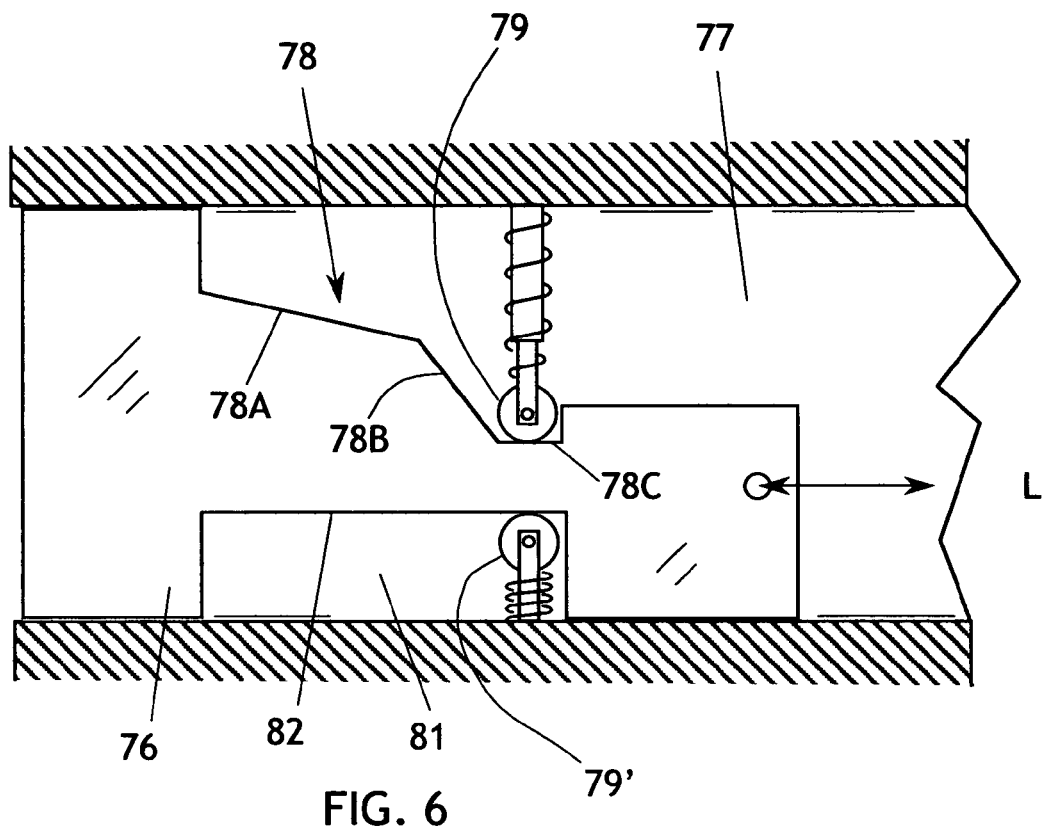
FIG. 6 is a schematic view of a further embodiment of a negative force constant spring assembly of the shape memory alloy actuator of the present invention.

With regard to FIG. 6, a further embodiment of a return spring having a having a negative force constant; i.e., the restoring force decreases as extension of the spring increases. A bar or similar moving element 76 is disposed in a channel 77 and is constrained to translate longitudinally therein, as shown by arrow L. The element 76 includes a side surface 78 defined by contiguous surface portions 78A-78C that comprise a camming surface. A cam follower 79 is comprised of a telescoping mounting for a roller and a spring for urging the roller to engage the camming surfaces 78A-78C. The roller is mounted to roll along the camming surfaces as they translate along the channel in the longitudinal direction. On an opposed side of the element 76, a rectangular cutout portion 81 defines a linear, longitudinal surface 82 engaged by a cam follower 79'. The cam follower 79' is provided to apply a lateral force to the element 76 to counterbalance the lateral force imparted by cam follower 79, so that the element 76 will avoid becoming jammed in the channel 77.

It may be appreciated that the resilient force impinging cam follower 79 into camming surfaces 78 is resolved by classical mechanics techniques into vector forces exerted longitudinally and laterally on the element 76. The lateral forces are offset by the follower 79' and the channel constraints, so that the longitudinal force component urges the element 76 to translate longitudinally, thereby constituting a restoring force. For example, as the element 76 translates distally (to the right in FIG. 6), the cam follower 79 encounters the steeply angled cam surface portion 78B, and exerts a strong, substantially constant longitudinal restoring force. When the cam follower 79 progresses and impinges on the camming surface portion 78A, the restoring force is decreased to a lower constant due to the shallower slope. (The surface 78 may comprise any number of segments, curves, or other features.) As the element translates proximally under the urging of the cam follower 79, the portion 78C acts as a stop to prevent further proximal translation. The spring assembly is capable of generating any desired restoring force function.

Figure 11:
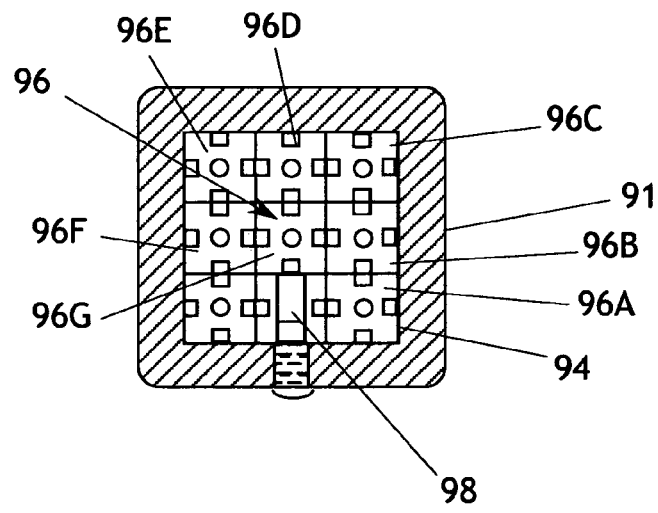
FIG. 11 is a top view of the assembled drive rods of the shape memory alloy actuator depicted in FIGS. 8-10.
Figure 12:
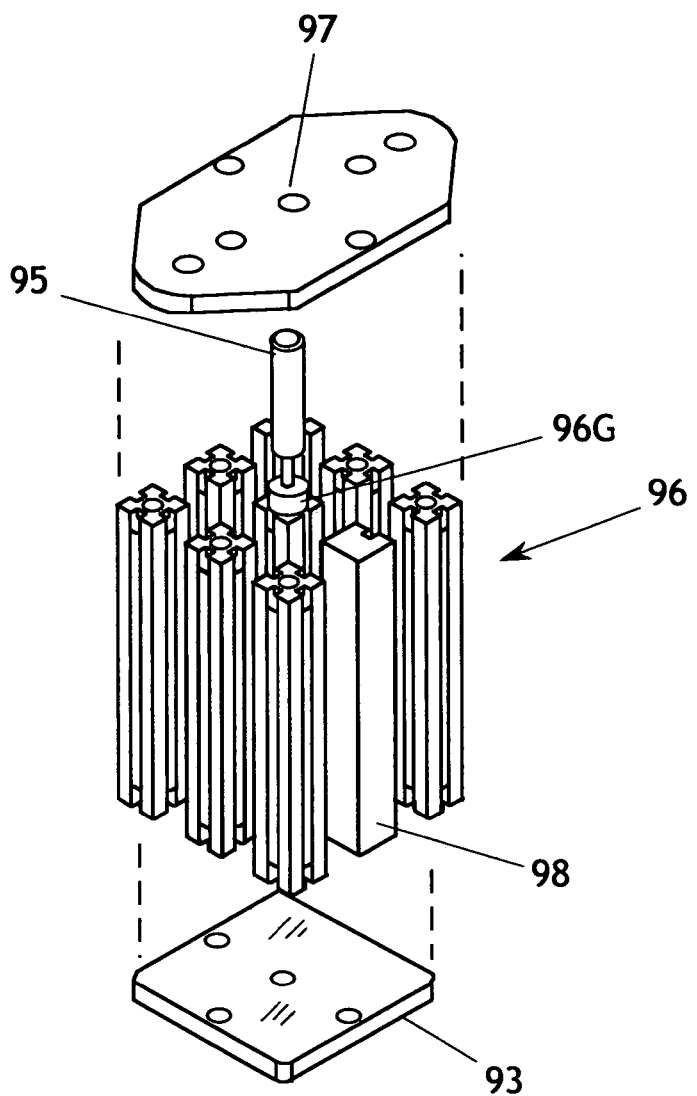
FIG. 12 is an exploded view of the drive rod assembly of the shape memory alloy actuator depicted in FIGS. 8-11.

With regard to FIGS. 8-13, a further embodiment of the linear actuator of the present invention includes a housing 91 having a generally rectangular exterior and defining a rectangular interior space 94 extending longitudinally therein. A bottom plate 93 and a top plate 92 close the opposed ends of the space 94, and the output plunger 95 of the actuator extends longitudinally through the central hole 97 of the top plate. Within the space 94 a matrix of drive rods 96 is disposed in closely packed array, the dimensions of the space 94 and the close spacing of the rods 96 constraining the rods 96 to be translatable only in the longitudinal direction. The rods 96 are formed as rectangular parallelepipeds, with each longitudinally extending rectangular surface of each rod being adapted to receive and secure one SMA wire, as detailed below. This construction enables any two rods 96 in the matrix to be connected together, end to opposite end, whether they are laterally or vertically adjacent (as viewed in FIG. 11. The matrix also includes a spring housing 98 occupying the space of one drive rod 96, as shown in FIGS. 11 and 12, and enclosing any form of return spring described herein. The drive rod 96G at the center of the matrix supports the output plunger 95, and is connected to the spring within the housing 98, so that the spring applies a restoring force to all the SMA wires sufficient to restore the wires to their original length when cooled.

Figure 13:
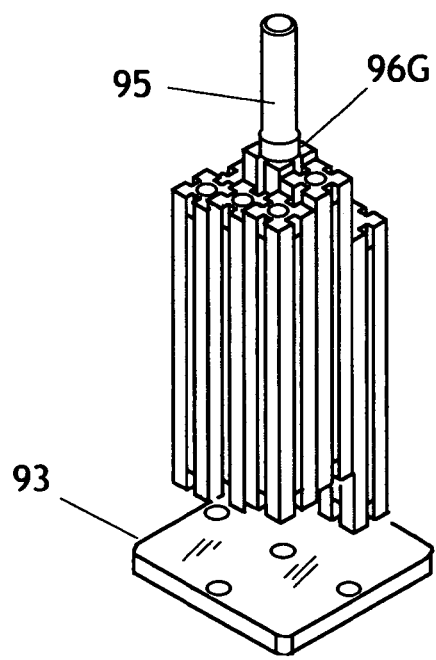
FIG. 13 is an exploded view of the drive rod assembly of the shape memory alloy actuator depicted in FIGS. 8-12, with the drive rods in an extended disposition.

Drive rod 96A may be connected at its lower end to an SMA wire that is connected at its upper end to the housing 91. The upper end of rod 96A is connected to an SMA wire that extends to the lower end of rod 96B. Likewise, rod 96B is connected to rod 96C, and so forth to rods 96D-96G, which supports the output plunger 95. When all the SMA wires are actuated, the drive bars 96A-96G extend in additive fashion, as shown in FIG. 13, to push the plunger 95 longitudinally with a strong, constant force. Although the array of drive bars 96 is depicted as a [3×3] matrix, the arrangement may take the general form of any [M×N] array.

Figure 14:
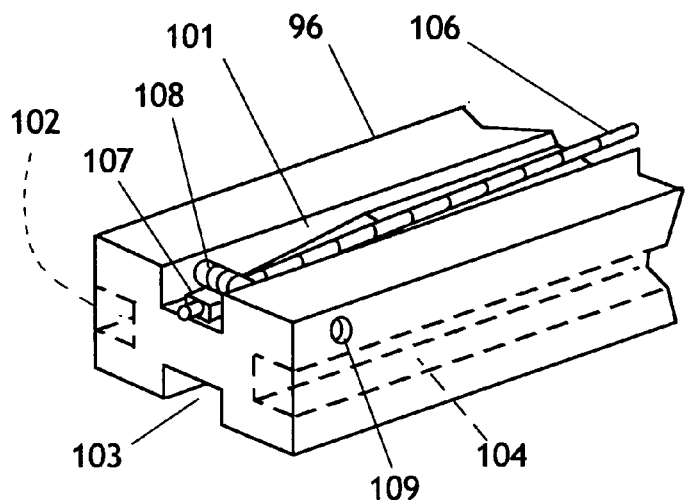
FIG. 14 is a partial perspective view of a drive rod connection to a shape memory alloy wire, in accordance with the present invention.

With regard to FIG. 14, the drive bars 96 include at least one of the longitudinally extending channels 101-104, each disposed in one of the four longitudinally extending rectangular faces of the parallelepiped configuration. Each channel 101-104 is dimensioned to receive and secure one SMA wire 106. The wire 106 is provided with a mounting die 107 crimped to each end thereof, and a retaining pin 108 extends across the end of the channel to pinch the die 107 between the pin 108 and the sloped bottom surface at the end of each channel. The opposed ends of each pin 108 are secured in a passageway 109 extending from opposed sides of the bar 96 and intersecting the channel 101. The provision of the channels 101-104 on each face of the bar 96 enables the connection of any bar 96 to any adjacent bar 96, whether vertically stacked or laterally adjacent. Each channel 101-104 may be prepared as described with reference to channel 101 to effect interconnection of the adjacent bars 96. The channels 101-104 enable the wires 106 to extend between the opposite ends of adjacent impinging bars 96 without any contact or mechanical interference imparted to the wires by the bars.

The crimped die 107 is formed of a conductive metal, and the engagement of the pin 109 enables electrical connection to the wires 106 by the simple expedient of securing the connecting wires to the outer ends of the pins 109.

With regard to FIG. 15, a further embodiment of the linear actuator of the invention makes use of a drive bar 96 as shown and described with reference to FIG. 14. In this embodiment the bars 96 are provided with top and bottom channels 102 and 103, and are vertically stacked to be linked in serial, additive fashion as described previously. The vertical stacks (two shown, but any number is possible) are supported by side panels 111 and 112, the side panels supporting at least one circuit board 113 that controls the application of current to the SMA wires of the vertical arrays. Conductors 114 extend from each circuit board to the mounting pins 108 of the adjacent drive bar vertical stack to complete circuits through the SMA wires. Alternatively, the circuit board may provide brush contacts that engage sliding contact pads placed on the drive bars 96. In this embodiment the topmost drive bar undergoes the additive translation of all the subjacent bars, as described previously.

Figure 15:
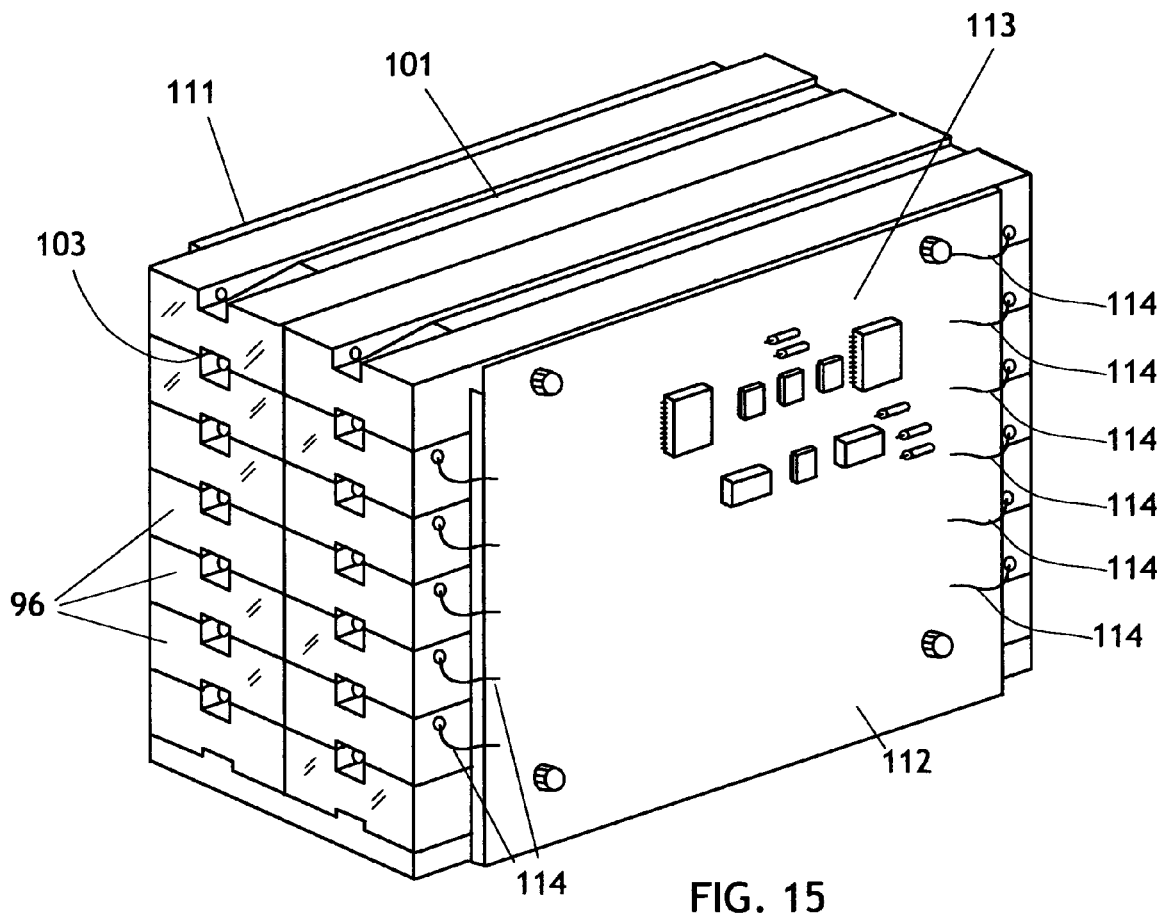
FIG. 15 is a perspective view of a further embodiment of a shape memory alloy actuator employing the drive rod connection assembly shown in FIG. 14.
Figure 22:
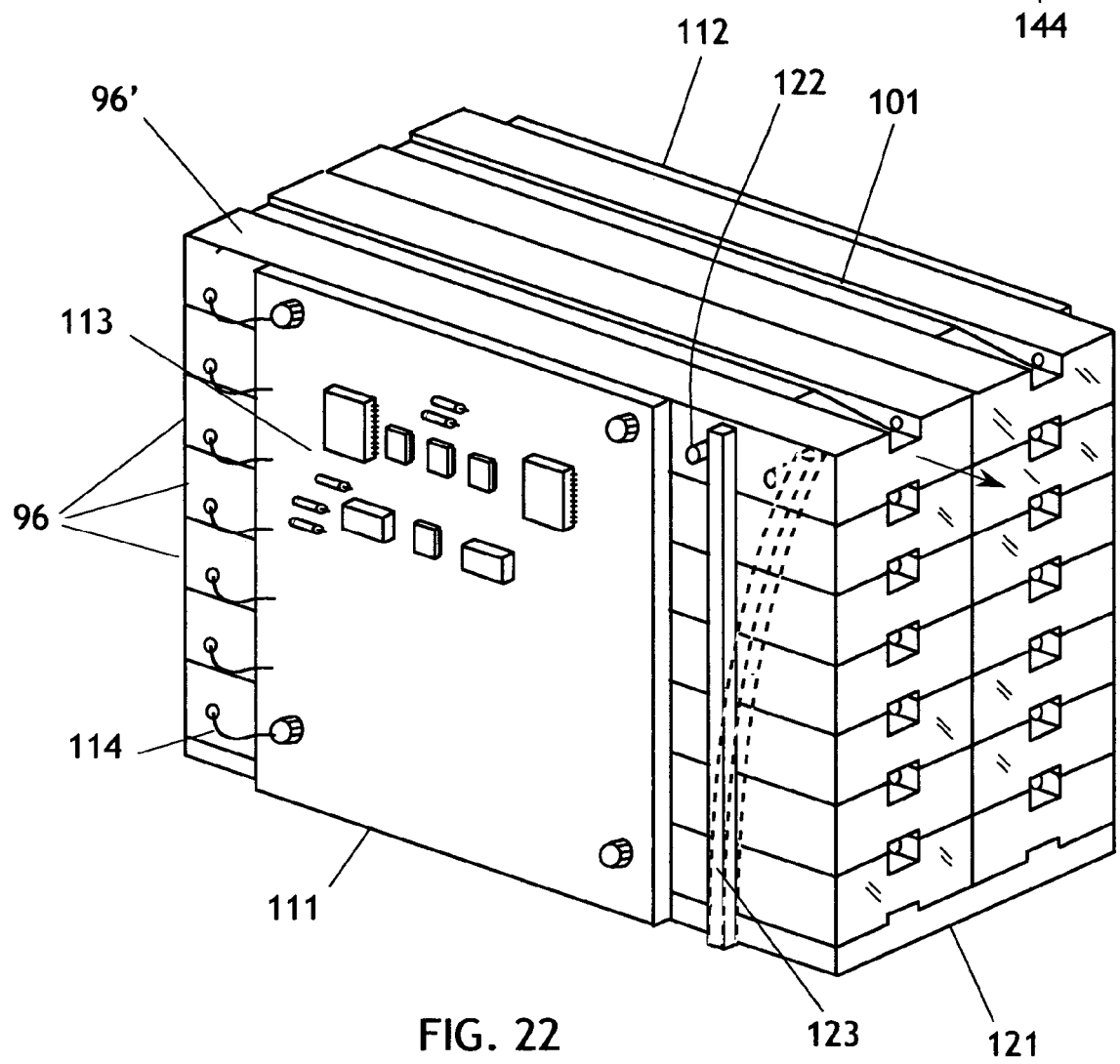
FIG. 22 is a perspective view of another embodiment of a shape memory alloy actuator employing the drive rod connection assembly shown in FIG. 14.

A further embodiment of the return spring 39 is shown in FIG. 22 with reference to the embodiment depicted in FIG. 15. However, this spring construction may be employed with any of the linear actuator embodiments described herein. Drive bar 96' at the upper end of the vertically stacked array of drive bars 96 undergoes the maximum longitudinal displacement, and operates the output plunger (not shown) of the array. A base plate 121 joins the side panels 111 and 112 below the array of drive bars. A deflection pin 122 extends laterally outwardly from drive bar 96', and an elastically deformable beam 123 extends upwardly from the base plate 121 adjacent to the vertically stacked array, with the upper end of the beam disposed to impinge on the deflection pin 122 when the actuator is retracted. When the SMA wires are heated and contract, the longitudinal translation of bar 96' drives the deflection pin 122 to bend the beam 123 elastically, thereby exerting a restoring force on the bar 96' and on the array of drive bars connected thereto. The beam 123 may be shaped with a non-uniform cross-section, or provided with other aspects that provide a return force function that approximates the spring functions A-D of FIG. 7 sufficiently closely to provide full return of the SMA wires to their elongated state, and also a high number of repetition cycles.

Figure 16:
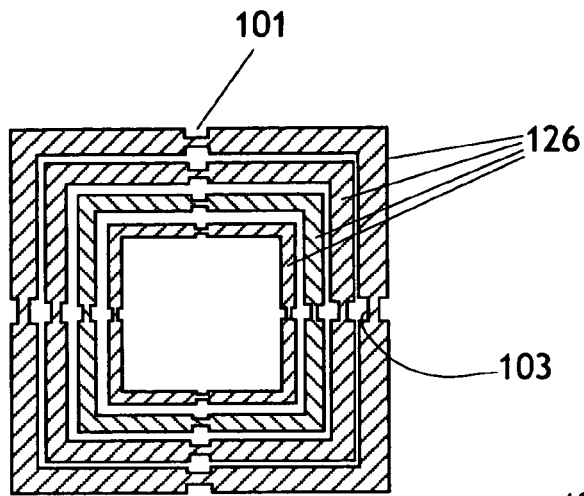
FIG. 16 is a cross-sectional end view of a further embodiment of a shape memory alloy actuator of the present invention.
Figure 17:
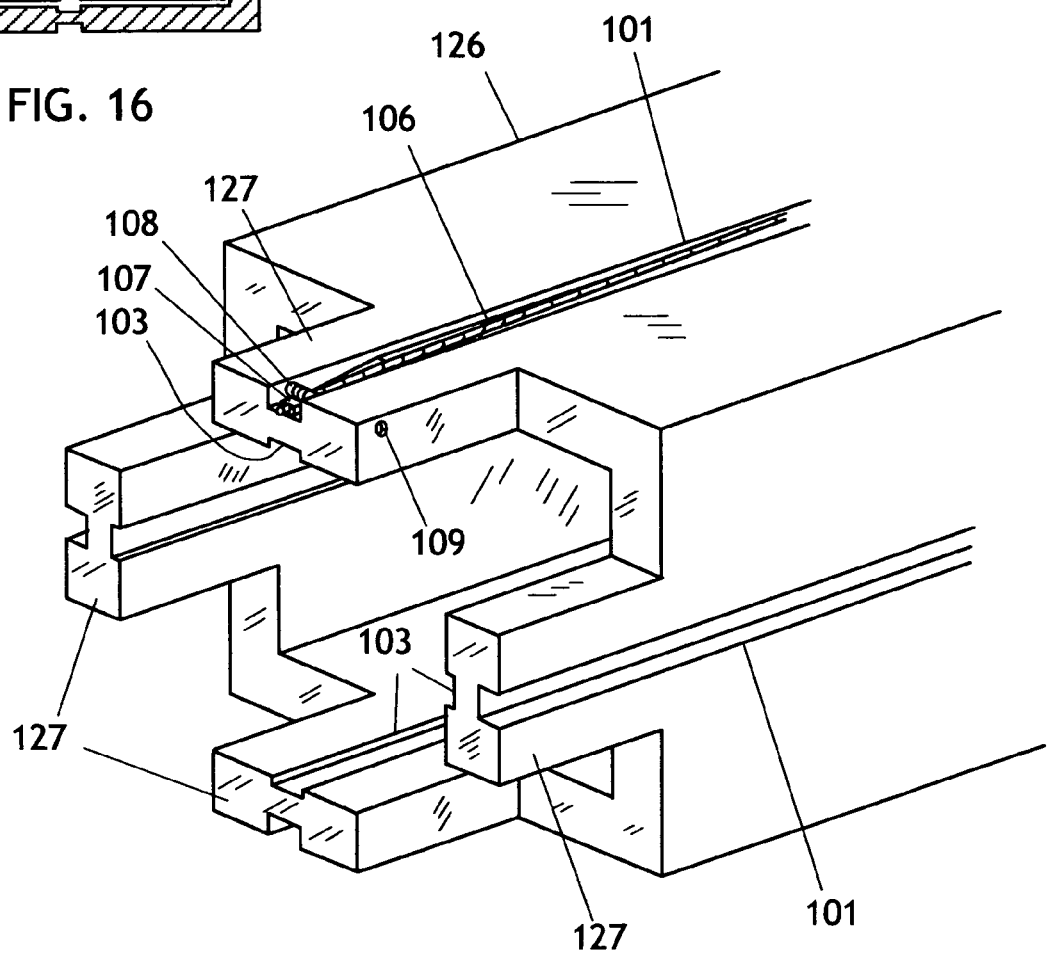
FIG. 17 is a perspective view of one motive element of the shape memory alloy actuator shown in FIG. 16.
Figure 18:
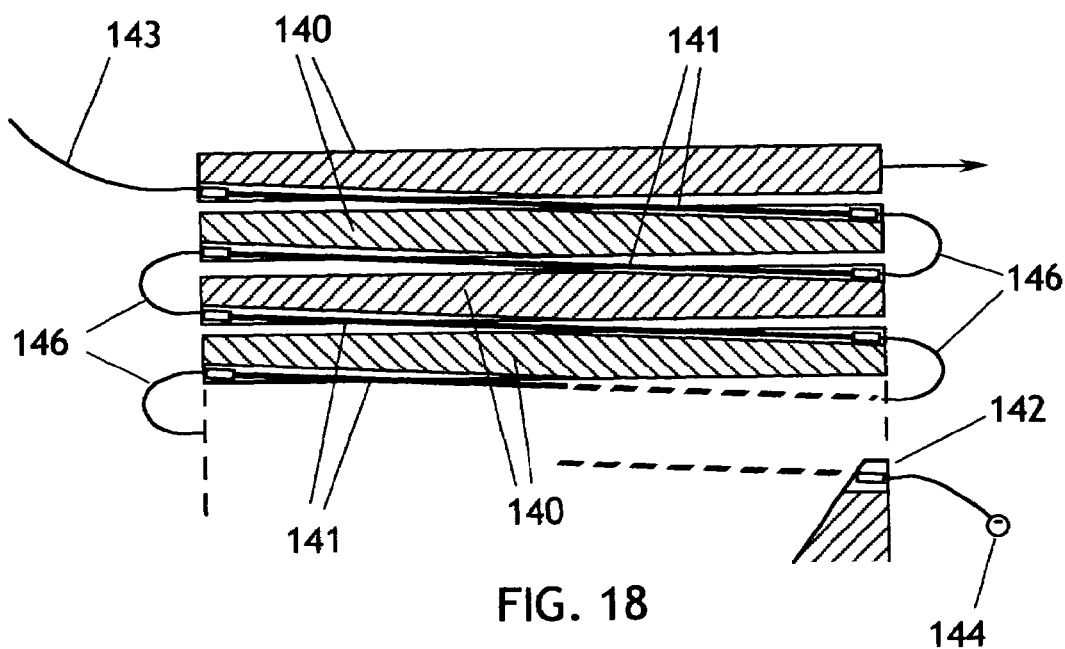
FIG. 18 is a schematic depiction of one series electrical circuit arrangement for heating the SMA wires of the shape memory alloy actuator of the invention.

With reference to FIGS. 16 and 17, a further embodiment of the linear actuator of the invention includes a plurality of drive modules 126, each comprising a tubular member of rectangular cross-section, although circular and polygonal cross-sections are equally usable. The drive modules 126 are dimensioned to be disposed in concentric, nested fashion with sufficient clearance for telescoping translation therebetween. Each drive module 126 includes a plurality of longitudinally extending projections 127, each projection 127 extending from a medial end portion of one side of the respective drive module 126, as shown in FIG. 17. (For a cylindrical tubular array, the projections are spaced at equal angles about the periphery of the end of each drive module.)

Each side of each drive module 126 is provided with longitudinally extending channels 101 and 103 on the outer and inner surfaces, respectively, the channels being constructed as described with reference to FIG. 14. Each projection 127 supports a mounting pin 108 received in aligned holes 109 to retain the crimped die 107 of an SMA wire 106, as described previously. The inner channel 103 provides clearance for the SMA wire of the nested drive module disposed concentrically within. The number of SMA wires used may vary; in the embodiment shown in FIG. 17, at least two SMA wires 106 are used at radially opposed sides of the nested modules to provide balanced contractile forces that resist binding of the telescoping elements. Four SMA wires per module may be used, one secured to each projection 127, to provide maximum contractile force and maximum force to the actuating plunger. A return spring assembly, of any construction discussed herein, may be placed within the inner cavity of the innermost concentric element 126 and connected between the innermost and outermost elements 126.

The SMA wires 106 of any contractile array described herein may be connected for ohmic heating by any of the circuit arrangements depicted in FIGS. 18-21. In these Figures, each drive element 140 may represent any of the drive bars or drive modules 32, 59, 96, or 126 described previously. Single SMA wires 141 are connected at like ends of the elements 140 by extendable wires (or sliding brush contacts) 146 to form a continuous series circuit that includes all of the SMA wires 141. The moving end of the series circuit is connected to lead wire 143 and the other end, which is fixed in anchor point 142, is connected to lead 144 of the current source that actuates the array. This circuit arrangement assures that all wires carry the same current.

Figure 19:
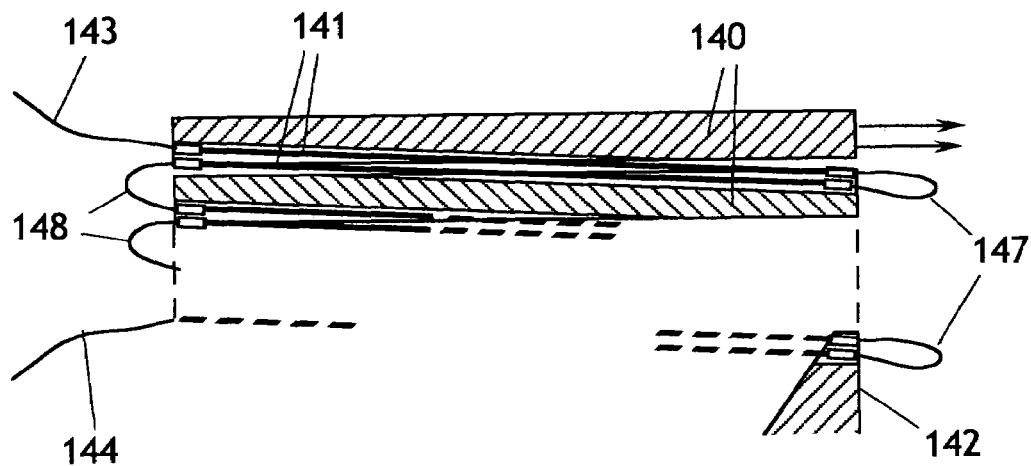
FIG. 19 is a schematic depiction of a series electrical circuit arrangement for heating paired SMA wires of the shape memory alloy actuator of the invention.

With regard to FIG. 19, a pair of SMA wires 141 are extended between each pair of drive elements 140, thereby multiplying the force output. This arrangement is depicted in the embodiments of FIGS. 15-17 and 22, although all embodiments may support multi-wire arrangements. The paired SMA wires are electrically isolated each from the other, and extendable wires 147 (or sliding brush contacts) are secured to the like ends of the paired SMA wires, so that each pair of SMA wires is connected in series. The series pairs are likewise connected in a series electrical circuit by extendable wires 148, with lead wires 143 and 144 extending from the same end of the array. (It may be appreciated that the number of wires extending between adjacent drive stages may be any integer number other than two.) This arrangement provides multiplied force output using a series circuit to actuate the wires.

Figure 20:
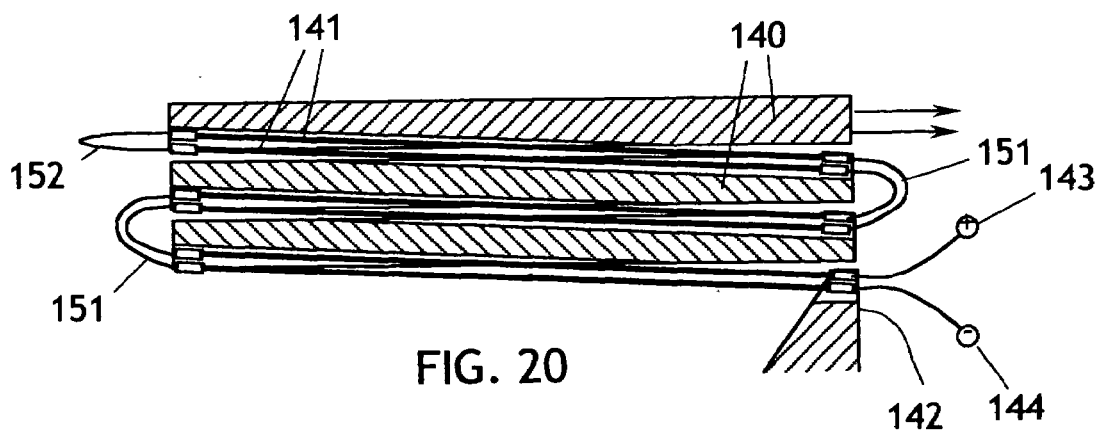
FIG. 20 is a schematic depiction of another series electrical circuit arrangement for heating paired SMA wires of the shape memory alloy actuator of the invention.

With regard to FIG. 20, a further embodiment of the electrical actuating circuit of the invention includes paired SMA wires 141 extending between adjacent drive elements 140, the paired wires being electrically isolated each from the other. Extendable wires 151 interconnect the SMA wires so that each SMA wire of each pair is connected in series with one of the SMA wires of the adjacent drive element. Thus the circuit is comprised of two series branches that extend from the anchor point 142 to the proximal end of the output drive element 140, where they are bridged by connection 152. This connection arrangement provides multiplied output force and, most notably, both leads 143 and 144 from the power circuit are connected at the fixed anchor point 142, so that the leads are not connected to a moving object.

Figure 21:
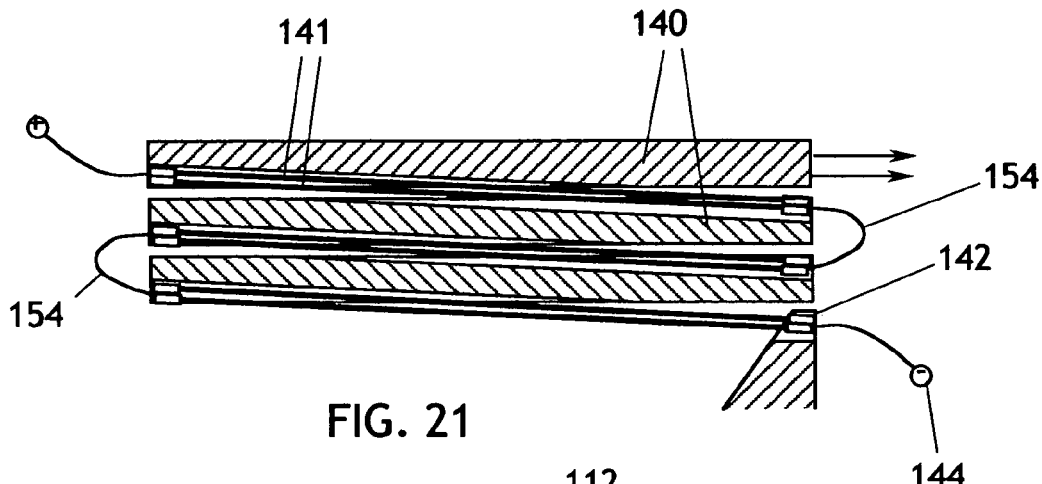
FIG. 21 is a schematic depiction of another series electrical circuit arrangement for heating paired parallel SMA wires of the shape memory alloy actuator of the invention.

Another embodiment of the actuating circuit, depicted in FIG. 21, also makes use of paired SMA wires 141 extending between adjacent drive elements 140. In this arrangement each pair of SMA wires is connected in parallel, and the paralleled wires are connected by extendable wires 154 in a series circuit. Lead 144 connects to the anchor point of the array, and lead 143 is connected at the proximal end of the output drive element 140. This circuit arrangement provides the multiplied force output from a current draw that is double that of the previous embodiments.

Previous embodiments, such as those shown in FIGS. 15 and 22, depict electrical power connections from the circuit board to each drive bar assembly. This feature permits any of the connection schemes described above, and also permits direct connection to each SMA wire for individual actuation thereof. Thus actuation of the SMA wires may be carried out simultaneously, or staged sequentially in individual or grouped actuations.

Figure 23:
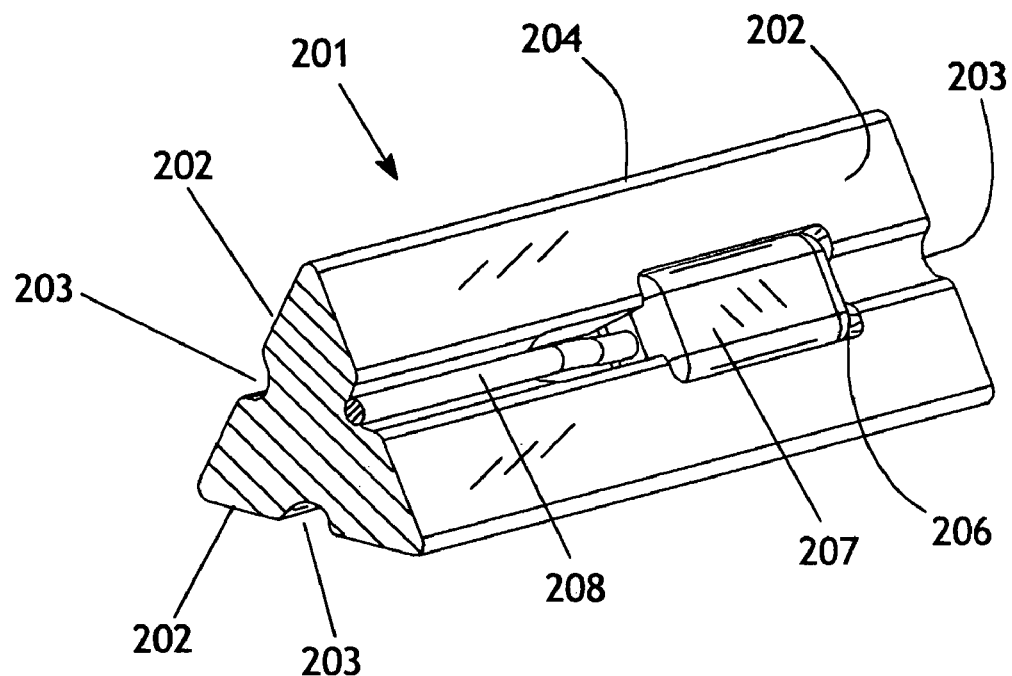
FIG. 23 is an enlarged cross-sectioned perspective view of a trigon embodiment of the drive link of the invention.

With regard to FIG. 23, a further embodiment of the drive rod comprises a trigon link 201. Each trigon link 201 is provided with an equilateral triangular cross-section defining identical longitudinally extending planar faces 202. A wire groove 203 extends longitudinally along the bisector line of each planar face. The vertices formed by the intersections of the planar faces are radiused or otherwise blunted 204 to prevent undue wear. Each planar face 202 is provided with a recessed crimp pocket 206 at one end of each wire groove 203. A crimp 207 is squeezed onto one end of an SMA wire 208 and driven into the crimp pocket 206 to secure the wire end to the link. The other end of the wire 208 is led to the confronting planar face of an adjacent link 201 where it is joined by a crimp driven into a similar crimp pocket. This linkage is reiterated among adjacent links to form a displacement multiplied SMA mechanism, in which the displacement of each SMA wire is multiplied by the number of wires connected between the links, as described above in the previous embodiments. (It is noted that other techniques for attachment of the SMA wire to the link may be used, such as laser welding, ultrasonic welding, spot welding, and the like.)

The grooves 203 are dimensioned so that confronting grooves of adjacent links combine to form a channel that guides a SMA wire 208 extending therein. This arrangement provides an intrinsic return mechanism to restore the links to their quiescent (retracted) position with little or no added spring force required. This IRM is described elsewhere in this disclosure, and is covered in detail in copending U.S. patent application Ser. No. 10/200,672, filed Jul. 7, 2002. It is considered a companion application and is incorporated herein by reference.

The link 201 may be fabricated of a conductive metal such as aluminum, which is then anodized to form an electrically insulating oxide coating on all surfaces. Alternatively, the link may be fabricated of a conductive metal that is then coated or overmolded with an insulating compound that may also define some or all of the surface features described above. The crimp pocket 206 may be milled or punched, and the crimp-to-pocket contact is electrically conductive. Thus an electrical path is formed through each link 201 and the crimp and SMA wire secured thereto, to the adjacent link to which the SMA wire is connected, and so on.

One benefit of the trigon configuration is the variety of stacking patterns that it makes possible. With regard to FIG. 24, a central output shaft 211 having a hexagonal cross-section is provided, each facet of the hexagon being configured similarly to the planar faces 202. (In FIG. 24, each SMA wire 208 is viewed on end as a black dot. Each black dot 1) adjacent to a hexagonal facet indicates where a link is joined to the shaft; 2) at an outer face of a link indicates where a link is joined to the housing; 3) between two confronting faces 202 indicates the serial joining of the two respective links.) Applying a link 201 face-to-face to each hexagonal facet, and filling in the triangular voids therebetween with other links 201 results in 18 links surrounding the output shaft 211. When all the links are joined in serial fashion by SMA wires 208, and the eighteenth link is joined to the housing (described below) by a SMA wire 208, the result is the displacement multiplication of 19 SMA wires (labeled 1×19 in FIG. 24), yielding a substantial output stroke for the shaft 211. In the configuration labeled 2×10, there are two groups of nine links that are joined serially, with one end link of each group joined to the housing and the other end link of each group joined to the output shaft 211. The result is a stroke that is approximately half as long and twice as forceful as the 1×19 configuration. Likewise, the links 201 may be connected in 3×7 or 6×4 or 4×6 configurations to produce strokes that are shorter but even more forceful. These different configurations, which have the same hexagonal outer conformation, provide a wide range of output stroke and force that enables the actuator to be adapted to various uses and mechanisms. Of course, the connection of an SMA wire to the housing may be eliminated in any of these configurations to facilitate assembly.

Figure 31:
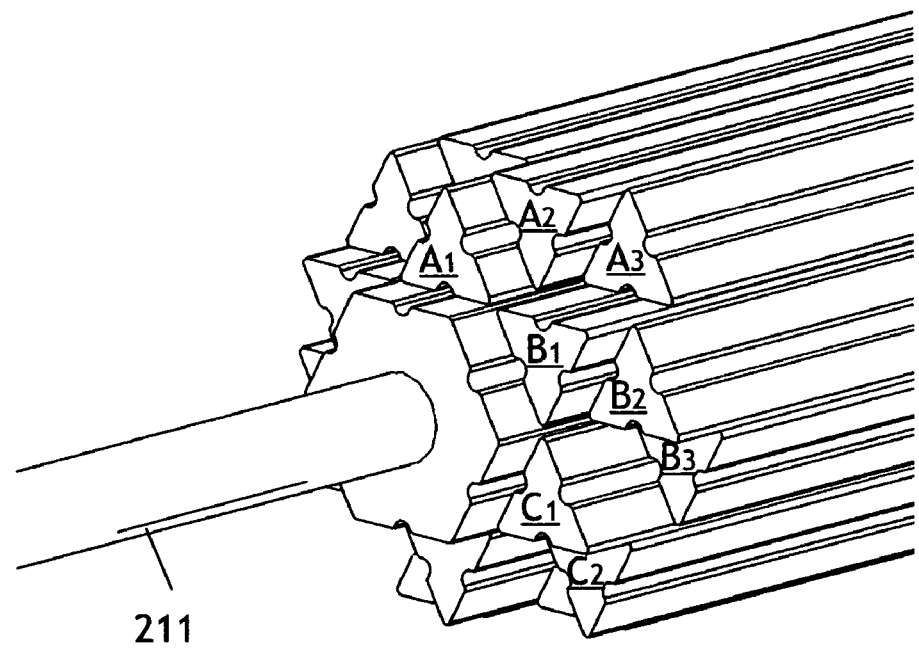
FIG. 31 is an enlarged cross-sectioned perspective view of a chevron embodiment of the drive link of the invention.

With regard to FIG. 31, a trigon link array having a 4×6 scheme of serial and parallel connections in which groups of 3 adjacent links are joined from the housing at one end of the serial chain to the output shaft 211 at the other end of the chain. This arrangement involves 6 serial chains, each connected between the housing and the shaft 211 and capable of extending it a distance equal to four SMA wire incremental contractions. Note that trigon links A1, A2, A3 are laterally adjacent to each other and that A2 extends incrementally beyond A3, and that A1 extends incrementally beyond A2, and that the shaft 211 extends incrementally beyond link A1. This is a clear indication that A1-A3 are linked in series from the housing to the shaft 211 and generating a displacement equal to 4 SMA wire contractions. Likewise trigon links B1-B3 are arrayed in descending order from the shaft, and so on with links C1-C3, and D-F series connections (not shown).

Figure 32:
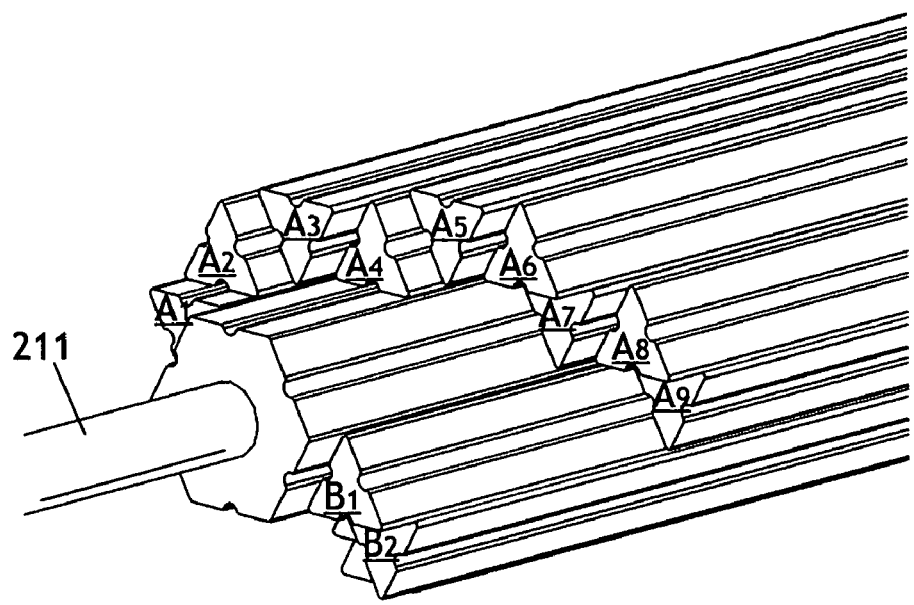
FIGS. 32 and 33 are perspective views of differing connection schemes of trigon-based actuators having links in an hexagonal stacking pattern.

With regard to FIG. 32, the same output shaft 211 and an equal number of trigon links may be connected in a 9×2 configuration in which two groups of 9 links each are joined mechanically and electrically, and each group is connected between the housing and the output shaft. Here the adjacent links A1-A9 are connected in descending serial order from the shaft 211 to the housing, as are links B1, B2, etc. The resulting stroke of shaft 211 is equal to nine SMA wire contractions, more than twice the previous example of FIG. 31.

Figure 25:
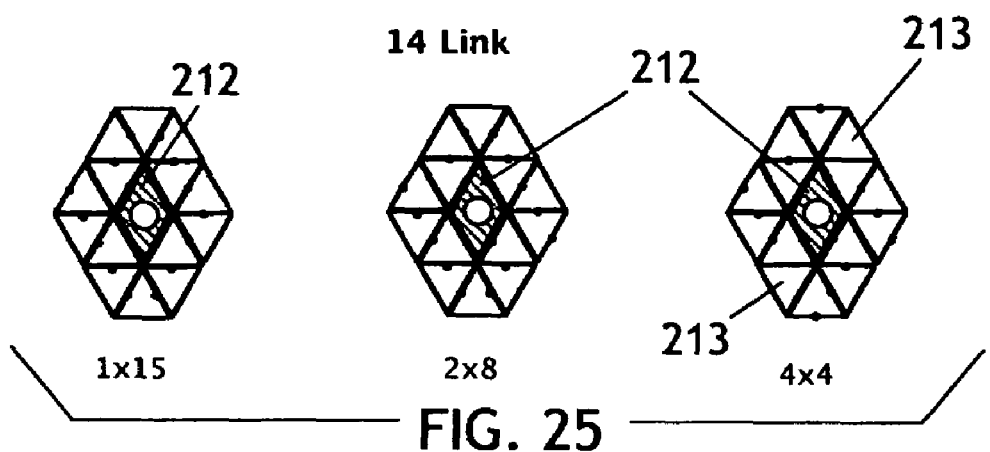
FIG. 25 is a series of end views of actuator devices in which trigon links of FIG. 23 are combined with a rhomboidal output shaft in various stroke and force combinations.
Figure 27:
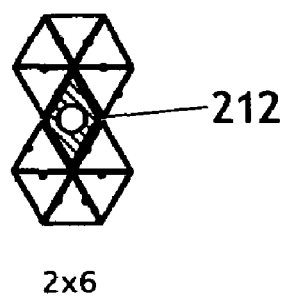
FIG. 27 is an end view of an actuator device in which trigon links of FIG. 23 are combined in groups of links stacked on opposite sides of a central rhomboidal output shaft.

With regard to FIG. 25, a central output shaft 212 having a rhomboid cross-section is provided, each facet of the rhomboid being configured similarly to the planar faces 202. This arrangement enables the stacking of fourteen links 201 about the shaft 212, with each facet of the rhombus in face-to-face contact with a link 201 and the outer configuration of the link stack being rhomboidal. When all the links are joined in serial fashion by SMA wires 208, and the fourteenth link is joined to the housing (described below) by a SMA wire 208, the result is the displacement multiplication of 15 SMA wires (labeled 1×15 in FIG. 25), yielding a substantial output stroke for the shaft 212. Another possible connection pattern is 2×8, yielding a stroke that is approximately half as long and twice as forceful. It is also possible to provide some links 201 that are not connected in the displacement multiplied scheme, but are placed merely to fill space in the stacking pattern. As shown in the 4×4 embodiment of FIG. 25, two links 213 are not connected mechanically or electrically, and the remaining links are joined in four groups of three, with the outermost wire of each group connected to the housing, so that the displacement sum is four and the stroke force is four times that of a single SMA wire. Alternatively, as shown in FIG. 27, a rhomboidal output shaft 212 may be surrounded by ten links 201, connected in two groups of five and capable of a 2×6 output stroke.

Figure 26:
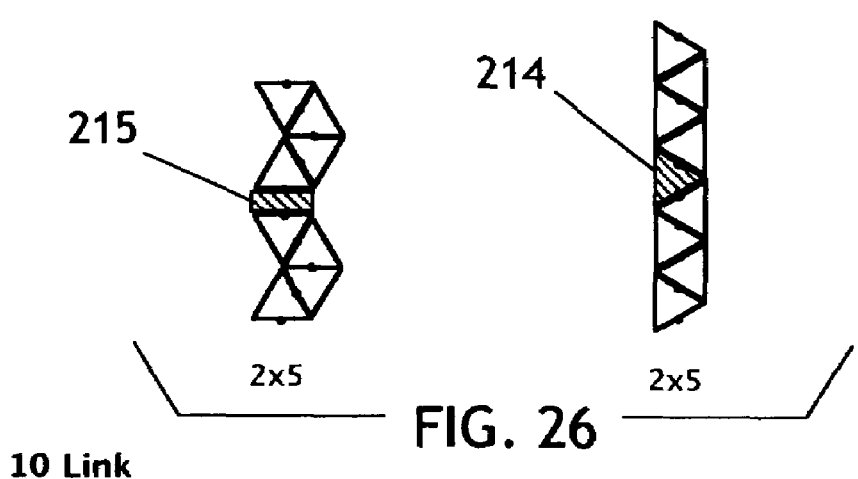
FIG. 26 is a series of end views of actuator devices in which trigon links of FIG. 23 are combined in groups of links stacked on opposite sides of a central output shaft that is trigon or rectangular.

The links 201 may also be stacked in other arrangements. As shown in FIG. 26, an output shaft 215 having a rectangular cross-section may be disposed intermediate of two groups of four links 201, resulting in a 2×5 drive configuration. Likewise, an output shaft 214 that is itself a trigon link may be disposed intermediate of two groups of four links 201, which also results in a 2×5 drive configuration.

In all of the connection schemes described above, the fact that each group of links 201 connected in series has one "outer" SMA wire connected to the housing or equivalent external structure, and the other "inner" SMA wire at the other end of the group is connected to the output shaft (211, 212, 214, or 215). This arrangement enables the "outer" wire to be electrically connected at the fixed point where it joins the housing (or similar anchoring structure). Given the fact that the output shaft may be conductive, the "inner" wires of the groups may be electrically connected at the shaft, so that an electrical path through the SMA wires is a circuit connected by fixed (non-moving) electrical connections at opposed ends of the circuit, with no moving contacts within the circuit. This fact enables reliable connections with no mechanical wear, and the provision of convenient connector terminals at the exterior of the device housing.

Figure 24:
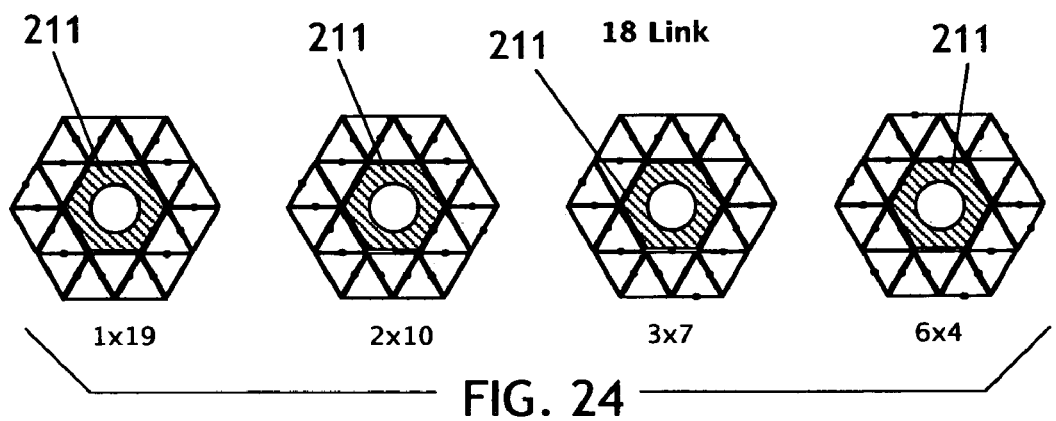
FIG. 24 is a series of end views of actuator devices in which trigon links of FIG. 23 are combined with a hexagonal output shaft in various stroke and force combinations.
Figure 28:
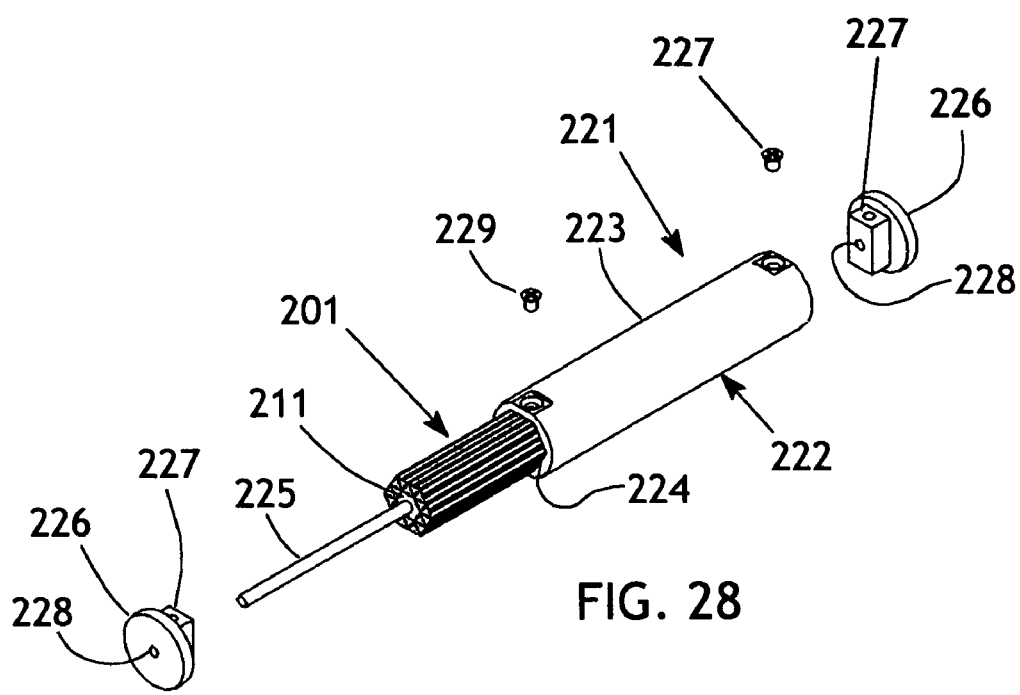
FIG. 28 is an exploded perspective view of an actuator device configured as shown in FIG. 24 with its housing and end caps.

With regard to FIG. 28, any of the link group arrangements of FIG. 24 may be assembled into a housing 221 comprised of a tubular case 222 having a generally cylindrical outer surface 223 and an inner bore 224 having a hexagonal configuration. The inner bore is dimensioned to receive the hexagonal profile of the trigon links 201 assembled to the central output shaft 211. An output rod 225 extends axially from the shaft 211. A pair of end caps 226 are provided with inner ends 227 adapted to be received in the bore 224, and a central passage 228 through which the rod 225 may translate reciprocally as the device is actuated and deactuated. Set screws 229 may be used to secure the end caps in tapped holes in the case 222.

Figure 29:
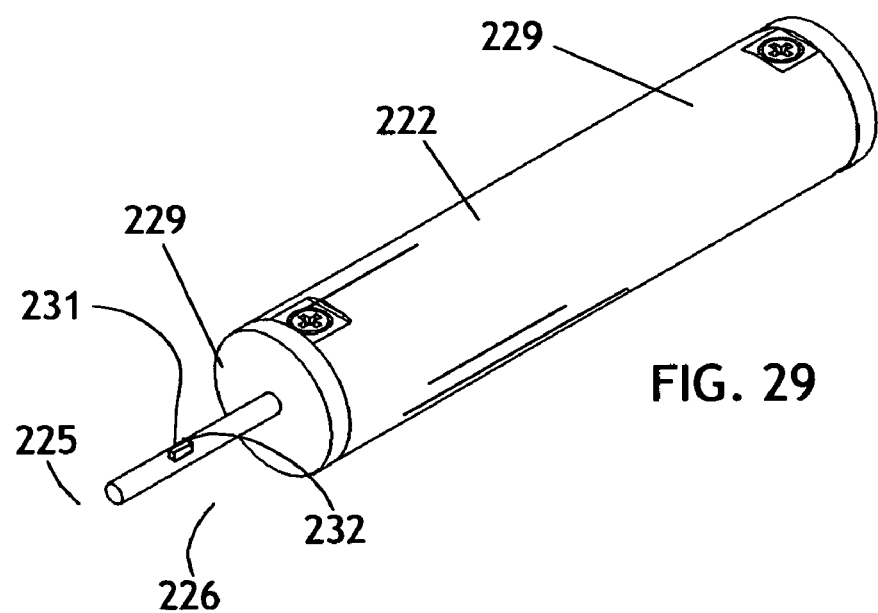
FIG. 29 is a perspective view of the actuator device of FIG. 28 in assembled condition.
Figure 30:
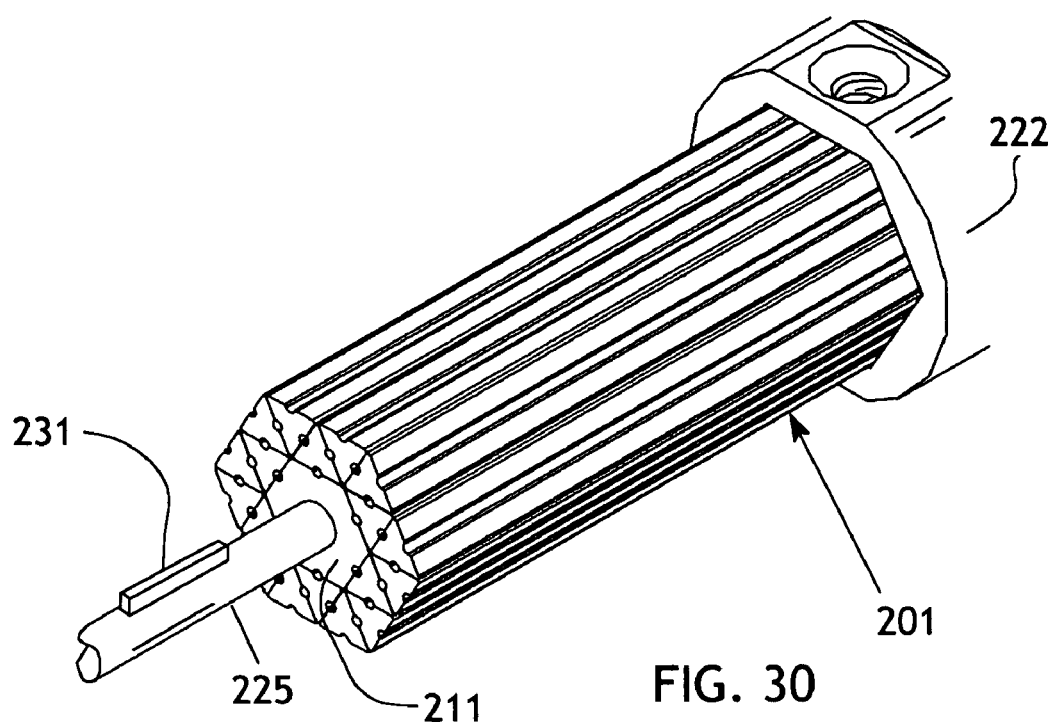
FIG. 30 is a perspective view of the trigon links of the actuator extending from the housing of the device of FIG. 28 or 29.

With regard to FIGS. 29 and 30, the assembled housing and end caps produces a substantial stroke/force output from a relatively compact package. Note that the end caps may be identical, or one may have passage 228 for the output rod, and the other may not, depending on whether the output rod is double-ended. In addition, the rod 225 may be provided with a key 231, and the end cap with a keyway 232, so that the rod cannot be twisted to impart torque to the links 201. This keyway rotational lock may be applied to any of the actuator devices described herein. Alternatively, the rod 225 may be provided with a non-cylindrical geometric shape (triangle, hexagon, octagon, etc.), and the passage 228 is formed in complementary fashion, so that the shaft cannot be rotated in the passage 228.

Note that the trigon configuration provides stiffness and bend moment greater than a rectangular beam of similar mass and length. At the same time, it has sufficient depth through the cross-section to enable the placement of a crimp pocket that is deep enough to receive a crimp that does not project beyond the surrounding planar face 202. Thus electrical and mechanical connections are made that do not interfere with the smooth sliding translation of the links abutting each other and the housing bore 224.

Figure 33:
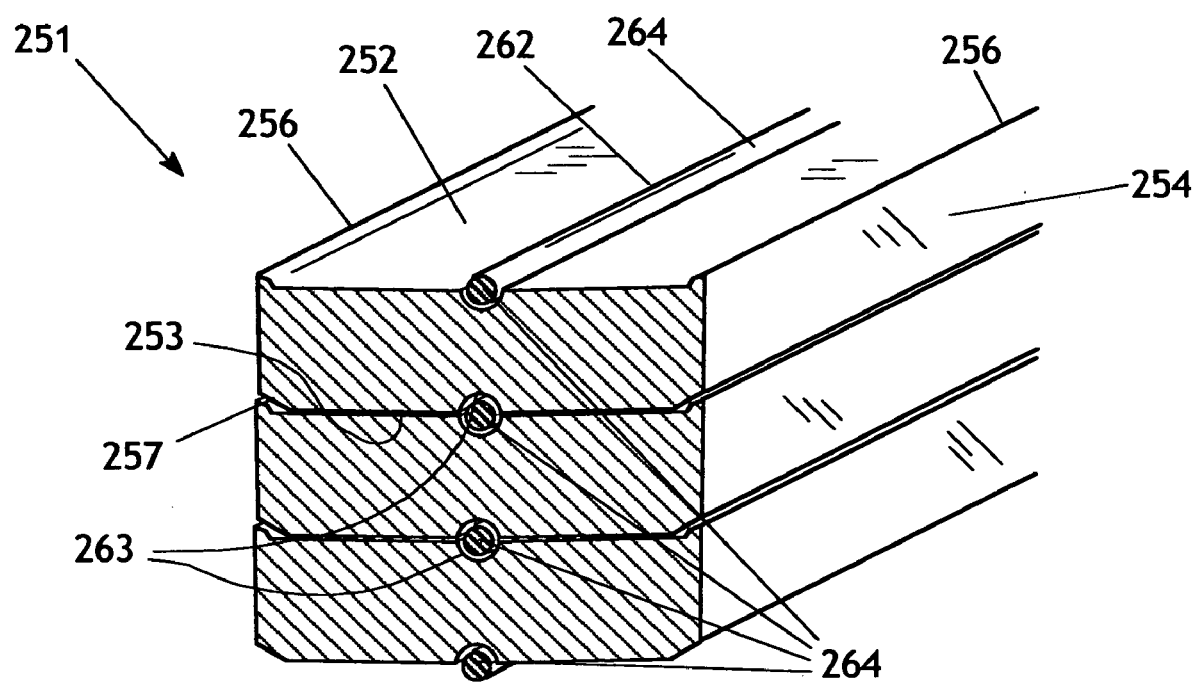

With regard to FIG. 33, a further embodiment of the drive rod comprises a chevron link 251. Each chevron link 251 is provided with a generally rectangular cross-sectional configuration, with upper and lower longitudinally extending surfaces 252 and 253 extending between longitudinal side walls 254. A pair of longitudinally extending flanges 256 extend upwardly along opposite edges of the upper surface 252. The opposed edges of the lower surface are provided with longitudinally extending bevels 257. In vertically stacked, abutting relationship, as shown in FIG. 31, the bevels 257 of each link 251 nest in the flanges 256 of the subjacent link to limit sliding movement only to the longitudinal direction.

Each chevron link is also provided with a pair of wire grooves 262 and 263 extending longitudinally along the bisector line of each planar surface 252 and 253, respectively. The grooves are dimensioned so that confronting top and bottom grooves 262 and 263 of vertically adjacent links 251 combine to form a channel that guides a SMA wire 264 extending therein. This arrangement provides an intrinsic return mechanism to restore the links to their quiescent (retracted) position with little or no added spring force required. This IRM is described elsewhere in this disclosure, and is covered in detail in copending U.S. patent application Ser. No. 10/200,672, filed Jul. 7, 2002. It is considered a companion case and is incorporated herein by reference.

Each link 251 is also provided with a recessed crimp pocket at opposite ends of wire grooves 263 and 263. A crimp is squeezed onto one end of an SMA wire 264 and driven into the crimp pocket to secure the wire end to the link. The other end of the wire 264 is led to the confronting planar face of an adjacent link 251 where it is joined by a crimp driven into a similar crimp pocket. (Refer to FIG. 23 for a comparable showing.) This linkage is reiterated among adjacent links to form a displacement multiplied SMA mechanism, as described above in the previous embodiments. Each link may be conductive and coated with a non-conductive material (such as anodized aluminum, or an overmolded polymer or plastic), so that a conductive circuit is established through each SMA wire, thence through the link to which it is crimped or welded, and thence to the next SMA wire.

Figure 34:
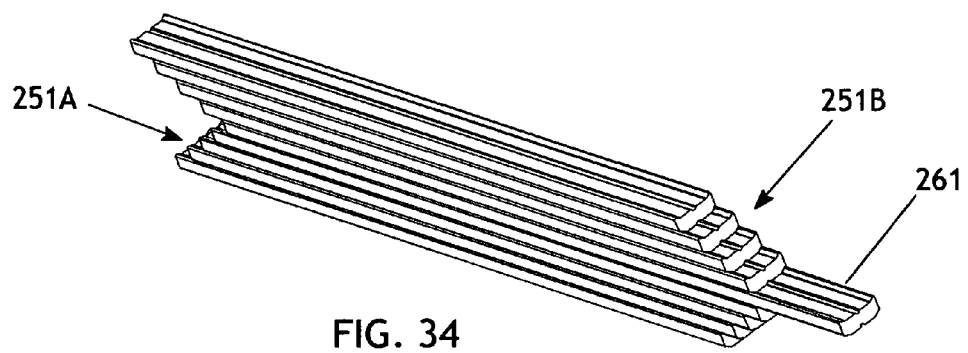
FIG. 34 is a perspective view depicting a vertical stack of chevron links connected in a center output arrangement.
Figure 35:
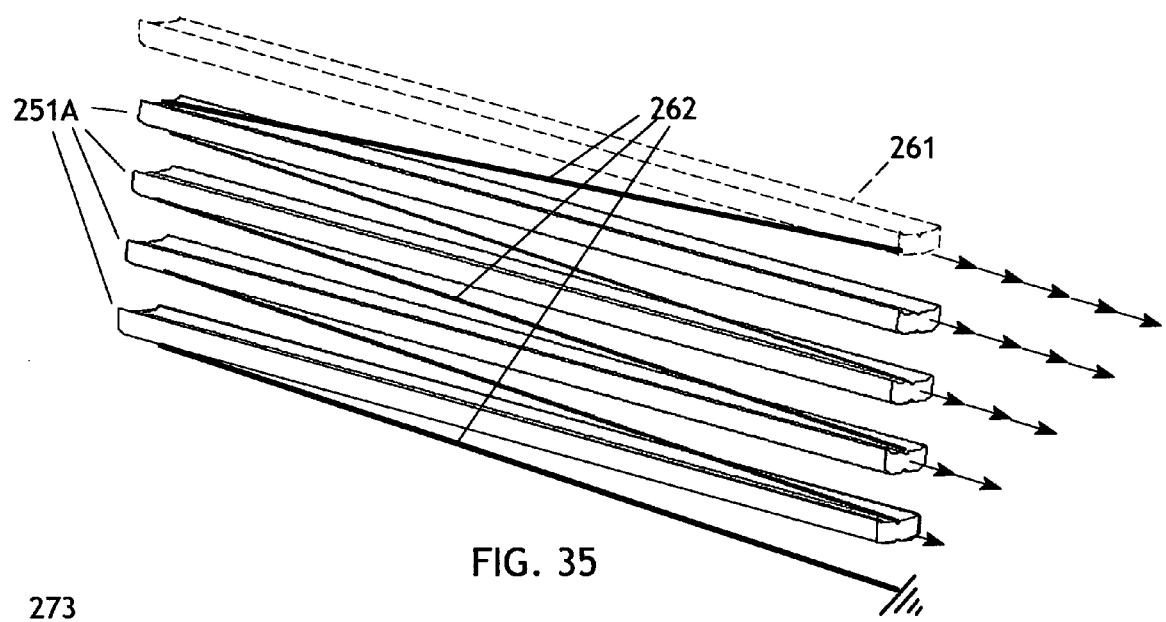
FIG. 35 is an enlarged perspective view showing a portion of the vertical stack of chevron links of FIG. 24, shown in exploded style with the SMA wires connected therebetween.
Figure 36:
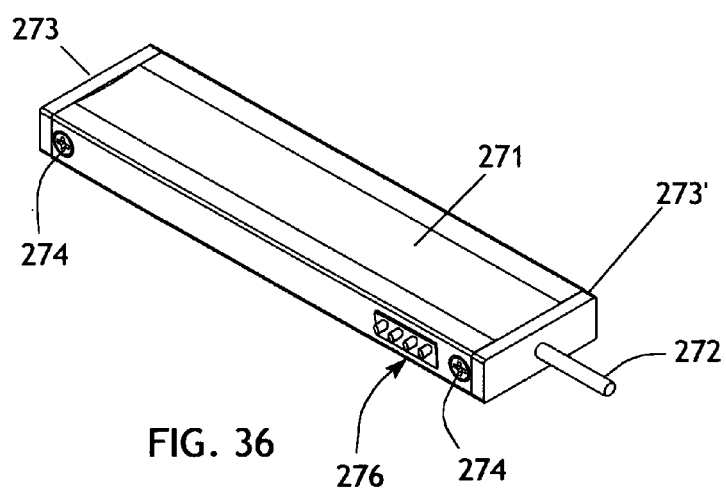
FIG. 36 is a perspective view of an SMA actuator device having a rectangular tubular housing for enclosing the actuator constructions shown in FIGS. 26, 34 and 35.

The chevron link 251 is designed to be stacked vertically with the SMA wires connected between one end of the upper surface of one link and the other end of the lower surface of the serially superjacent link. As shown in FIGS. 34-36, one possible vertical stacking arrangement of links 251 comprises a central output link 261 that is disposed medially in the stack of links. The links 251A below the output link 261 are connected contiguously by SMA wires 262 as shown in FIG. 35, so that the bottom-most link moves one incremental distance (one SMA wire contraction increment, shown by small arrow) due to that link having an SMA wire connected to the housing at its other end. Each superjacent link is moved a distance equal to the sum of the incremental movement of the subjacent links in the stack plus the increment of its associated SMA wire (shown by number of small arrows). The four links shown thus deliver to the output link 261 a stroke equal to five incremental movements. Likewise, the four links 251B above the central output link 261 are connected contiguously in mirror image to links 251A to drive the link 261 in the same direction for the same distance with the same force, so that during operation of the actuator the output link 261 extends outwardly from the middle of the stack as shown in FIG. 34.

With regard to FIG. 36, a further embodiment of the housing of the invention comprises a rectangular tubular member 271 having a rectangular interior bore dimensioned to receive a stack of links 251 as shown in FIG. 34, with an output rod 272 extending from the medial link 261. The interior bore includes sufficient space for the stack of links to under displacement multiplied translation, as shown in FIG. 34, and to return to a quiescent position in which the stack is aligned with respective ends in common planes. A pair of end caps 273 are secured in the opposed ends of the interior bore, and end cap 273' is provided with a central passage through which the output rod 272 extends freely. Set screws 274 may extend through a sidewall of the tubular member 271 to secure the end caps.

As mentioned above, a contiguous, serial connection scheme as shown in FIGS. 34 and 34 defines an electrical circuit through the SMA wires 264 and conductive links 251, and the circuit's only two external contact points may be fixed at the exterior of the member 271. For example, a contact connector 276 (plug or receptacle) may extend from one side wall of the member 271. It is provided with four connector posts, which is sufficient for providing power and sensor links (for temperature, travel limit, and the like). The power posts may be wired directly to the ends of the SMA wires at their anchorage in the housing. A similar external connector may be provided in any of the embodiments described previously with regard to FIGS. 28-30. Note also that the housing construction of FIG. 36 may be well-suited for the connection schemes of FIG. 26 using trigon links, or in general links of any geometric configuration that enables a stacked relationship as described herein.

Note that in all the embodiments described herein the channels or grooves in which the SMA wires are positioned may be dimensioned to confine the SMA wires to longitudinal movement only, whereby an intrinsic return mechanism is established for the contiguous assembly of links. The IRM may obviate the need for a return spring, depending primarily on the device to which the actuator is connected and its resistance to movement in the intrinsic return direction.

Although the invention is described with reference to the shape memory component comprising a wire formed of Nitinol, it is intended to encompass any shape memory material in any form that is consonant with the structural and functional concepts of the invention.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiments described are selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A linear actuator, including:
   a plurality of links extending in a longitudinal direction and disposed in a closely spaced array and adapted to undergo reciprocal translation in said longitudinal direction:
   an output shaft connected to said plurality of links and adapted to undergo reciprocal translation in said longitudinal direction;
   said plurality of links each having a common geometric form adapted for stacking in a predetermined array with respect to said output shaft;
   a plurality of shape memory wires connected to said plurality of links in serial, contiguous fashion;
   means for heating said shape memory wires beyond the memory transition temperature to contract said wires and urge said links to move in said longitudinal direction in displacement multiplied fashion; and,
   housing means for enclosing said plurality of links and said plurality of wires.

2. The linear actuator of claim 1, wherein said means for heating includes an electrical circuit extending through all of said SMA wires and all of said links.

3. The linear actuator of claim 2, wherein said plurality of links are divided into a plurality of separate groups, each of said groups being mechanically and electrically connected by said SMA wires in serial, contiguous, displacement multiplied fashion.

4. The linear actuator of claim 3, wherein said plurality of separate groups are mechanically connected between a mechanical ground and said output shaft.

5. The linear actuator of claim 4, wherein said housing means comprises a housing formed to extend about said plurality of links and plurality of wires.

6. The linear actuator of claim 4, wherein each of said groups includes a first SMA wire connected from said mechanical ground to a first link in the group, and a last SMA wire connected from a last link in the group to said output shaft.

7. The linear actuator of claim 6, wherein said housing includes at least one electrical connector disposed to connect to said first SMA wire at said mechanical ground.

8. The linear actuator of claim 6, wherein all of said groups are electrically connected at said output shaft as a common node.

9. The linear actuator of claim 3, wherein two separate groups of links are disposed at opposite sides of said output shaft, said output shaft extending and retracting from a medial position in said closely spaced array.

10. A linear actuator including:
    a plurality of links extending in a longitudinal direction and disposed in a closely spaced array and adapted to undergo reciprocal translation in said longitudinal direction:
    an output shaft connected to said plurality of links and adapted to undergo reciprocal translation in said longitudinal direction;

said plurality of links each having a common geometric form adapted for stacking in a predetermined array with respect to said output shaft;

a plurality of shape memory wires connected to said plurality of links in serial, contiguous fashion;

means for heating said shape memory wires beyond the memory transition temperature to contract said wires and urge said links to move in said longitudinal direction in displacement multiplied fashion;

wherein said plurality of links each have a trigon configuration comprised of three generally identical planar faces extending in said longitudinal direction and oriented by an equilateral triangular cross-section of each link.

11. The linear actuator of claim 10, further including a wire groove extending longitudinally along a longitudinal bisector line of each of said planar faces.

12. The linear actuator of claim 11, further including a crimp pocket formed in each of said planar faces at one end of said wire groove.

13. The linear actuator of claim 12 further including a crimp applied to one end of one of said SMA wires and driven into said crimp pocket, said crimp being below the surface of the respective planar face.

14. The linear actuator of claim 13, wherein said crimp forms an electrical connection through said crimp pocket to said link.

15. The linear actuator of claim 14, wherein said links are formed of a conductive material, and said links are coated with an electrically insulating material.

16. The linear actuator of claim 11, wherein said links are disposed in face-to-face abutment in said closely spaced array.

17. The linear actuator of claim 16, wherein said wire grooves of two of said planar faces in abutment together define a wire channel for retaining one of said SMA wires in an intrinsic return fashion.

18. The linear actuator of claim 16, wherein said wire grooves of two of said upper and lower surfaces in abutment in said vertical stack together define a wire channel for retaining one of said SMA wires in an intrinsic return fashion.

19. The linear actuator of claim 10, wherein said output shaft includes a plurality of said planar faces extending longitudinally thereon and adapted to abut said planar faces of said links in complementary fashion.

20. The linear actuator of claim 19, wherein said output shaft includes a hexagonal portion wherein each facet of said hexagonal portion comprises one of said planar faces.

21. The linear actuator of claim 20, wherein said predetermined array includes eighteen of said links stacked about said hexagonal portion and defining an hexagonal outer configuration of said predetermined array.

22. The linear actuator of claim 21, wherein said plurality of links are mechanically and electrically connected by said SMA wires in serial, contiguous, displacement multiplied fashion.

23. The linear actuator of claim 22, wherein said plurality of links are divided into a plurality of separate groups, each of said groups being mechanically and electrically connected by said SMA wires in serial, contiguous, displacement multiplied fashion.

24. The linear actuator of claim 23, wherein each of said groups includes a first SMA wire connected from a mechanical ground to a first link in the group, and a last SMA wire connected from a last link in the group to said output shaft.

25. The linear actuator of claim 24, wherein said mechanical ground includes a housing formed to extend about said plurality of links and plurality of wires and said shaft.

26. The linear actuator of claim 25, wherein said housing includes a tubular member having an inner bore configured to receive said hexagonal outer configuration of said predetermined array of links.

27. The linear actuator of claim 26, wherein said housing includes at least one electrical connector disposed to connect to said first SMA wire at said mechanical ground.

28. The linear actuator of claim 27, wherein all of said groups are electrically connected at said output shaft as a common node.

29. The linear actuator of claim 26, wherein said housing includes a pair of end caps secured in opposed ends of said inner bore.

30. The linear actuator of claim 29, further including a central passage in at least one of said end caps through which a portion of said output shaft may extend.

31. The linear actuator of claim 19 wherein said output shaft includes a rhomboid portion wherein each facet of said rhomboid portion comprises one of said planar faces.

32. The linear actuator of claim 31, wherein said predetermined array includes fourteen of said links stacked about said rhomboid portion and defining a rhomboidal outer configuration of said predetermined array.

33. The linear actuator of claim 32, wherein said plurality of links are mechanically and electrically connected by said SMA wires in serial, contiguous, displacement multiplied fashion.

34. The linear actuator of claim 33, wherein said plurality of links are divided into a plurality of separate groups, each of said groups being mechanically and electrically connected by said SMA wires in serial, contiguous, displacement multiplied fashion.

35. The linear actuator of claim 34, wherein each of said groups includes a first SMA wire connected from a mechanical ground to a first link in the group, and a last SMA wire connected from a last link in the group to said output shaft.

36. The linear actuator of claim 35, wherein said mechanical ground comprises a housing formed to extend about said plurality of links and plurality of wires and said shaft.

37. The linear actuator of claim 36, wherein said housing includes a tubular member having an inner bore configured to receive said rhomboidal outer configuration of said predetermined array of links.

38. A linear actuator, including:

a plurality of links extending in a longitudinal direction and disposed in a closely spaced array and adapted to undergo reciprocal translation in said longitudinal direction;

an output shaft connected to said plurality of links and adapted to undergo reciprocal translation in said longitudinal direction;

said plurality of links each having a common geometric form adapted for stacking in a predetermined array with respect to said output shaft;

a plurality of shape memory wires connected to said plurality of links in serial, contiguous fashion;

means for heating said shape memory wires beyond the memory transition temperature to contract said wires and urge said links to move in said longitudinal direction in displacement multiplied fashion;

wherein said plurality of links each have a chevron configuration comprised of a longitudinally extending member having a generally rectangular cross-section.

39. The linear actuator of claim 38, wherein each link includes a pair of longitudinally extending flanges projecting outwardly from laterally opposed edges of an upper surface of each link.

40. The linear actuator of claim 39, wherein each link includes a pair of longitudinally extending bevels along laterally opposed edges of a lower surface of each link.

41. The linear actuator of claim 40, wherein said links are adapted for vertical stacking in which said pair of bevels of each link is received in nesting relationship to said pair of flanges extending from the subjacent link in said vertical stack.

42. The linear actuator of claim 41, further including a wire groove extending longitudinally along a longitudinal bisector line of each of said upper and lower surfaces.

43. The linear actuator of claim 42, further including a crimp pocket formed in each of said upper and lower surfaces at one end of said wire groove.

44. The linear actuator of claim 43, wherein said links are formed of a conductive material, and said links are coated with an electrically insulating material.

45. The linear actuator of claim 44, wherein said links and said SMA wires are connected mechanically and electrically in contiguous, serial fashion for displacement multiplied reciprocal motion.

46. The linear actuator of claim 45, wherein said links are formed of a conductive material, and said links are coated with an electrically insulating material.

47. The linear actuator of claim 45, wherein said plurality of links are divided into two separate groups, each of said groups being mechanically and electrically connected by said SMA wires in serial, contiguous, displacement multiplied fashion.

48. The linear actuator of claim 47, wherein each of said groups includes a first SMA wire connected from a mechanical ground to a first link in the group, and a last SMA wire connected from a last link in the group to said output shaft.

49. The linear actuator of claim 48, wherein said housing means includes a housing formed to extend about said plurality of links and plurality of wires and said shaft.

50. The linear actuator of claim 49, wherein said housing includes a tubular member having an inner bore configured to receive rectangular outer configuration of said predetermined array of links.

51. The linear actuator of claim 50, wherein said housing includes at least one electrical connector disposed to connect to said first SMA wire at said mechanical ground.

52. The linear actuator of claim 51, wherein both of said groups are electrically connected at said output shaft as a common node.

53. The linear actuator of claim 50, wherein said housing includes a pair of end caps secured in opposed ends of said inner bore.

54. The linear actuator of claim 53, further including a central passage in at least one of said end caps through which a portion of said output shaft may extend.

* * * * *